United States Patent
Inada

(10) Patent No.: US 11,150,136 B2
(45) Date of Patent: Oct. 19, 2021

(54) COLOR ACCURACY VERTFICATION DEVICE THAT MANAGES COLOR ACCURACY OF PLURALITY OF PRINTERS

(71) Applicant: Konica Minolta, Inc., Tokyo (JP)

(72) Inventor: Ryohei Inada, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 151 days.

(21) Appl. No.: 16/547,978

(22) Filed: Aug. 22, 2019

(65) Prior Publication Data
US 2020/0064196 A1 Feb. 27, 2020

(30) Foreign Application Priority Data

Aug. 24, 2018 (JP) .............................. JP2018-157475

(51) Int. Cl.
*G01J 3/52* (2006.01)
*G03G 15/00* (2006.01)
*G06T 7/90* (2017.01)
*G06F 3/12* (2006.01)

(52) U.S. Cl.
CPC ............ *G01J 3/52* (2013.01); *G03G 15/5041* (2013.01); *G06F 3/1208* (2013.01); *G06T 7/90* (2017.01); *G03G 2215/0158* (2013.01); *G06T 2207/30144* (2013.01)

(58) Field of Classification Search
CPC .................. G01J 3/52; G03G 15/5041; G03G 2215/0158; G06T 7/90; G06T 2207/30144; G06F 3/1208; H04N 1/6033; H04N 1/6055; H04N 1/40006
See application file for complete search history.

(56) References Cited

U.S. PATENT DOCUMENTS

| 9,871,951 | B2 | 1/2018 | Tsukano | |
|---|---|---|---|---|
| 2013/0293923 | A1* | 11/2013 | Fisher | G06F 3/1285 358/1.15 |
| 2016/0044209 | A1* | 2/2016 | Tsukano | H04N 1/00023 358/1.9 |
| 2017/0208217 | A1* | 7/2017 | Soriano | G06F 3/1215 |

FOREIGN PATENT DOCUMENTS

| JP | 2012217054 A | 11/2012 |
|---|---|---|
| JP | 2017-92594 A | 5/2017 |
| JP | 2017092594 A * | 5/2017 |

OTHER PUBLICATIONS

Office Action issued in the counterpart Chinese Patent Application No. 201910766363.9, dated Jun. 4, 2021 (12 pages).

* cited by examiner

*Primary Examiner* — Christopher Wait
(74) *Attorney, Agent, or Firm* — Osha Bergman Watanabe & Burton LLP

(57) ABSTRACT

A color accuracy verification device includes: a hardware processor that: acquires a colorimetric value for each color patch of color accuracy verification charts generated by a plurality of printers; stores the colorimetric value in time series; sets a target printer to carry out color accuracy verification; and verifies color accuracy based on: the colorimetric value of the target printer stored in the hardware processor; and a verification reference value set in advance; and a display that displays a verification result by the hardware processor for the target printer.

16 Claims, 31 Drawing Sheets

TOKYO-PRINTER #1 AT TIME POINT OF 3/4

| VERIFICATION ITEM | TOLERANCE VALUE | PREDICTED VALUE | VERIFICATION RESULT |
|---|---|---|---|
| ΔE_AVERAGE | 4.0 | 3.1 | PASS |
| ΔE_MAXIMUM | 10.0 | 8.5 | PASS |
| ΔE_PRIMARY COLOR | 5.0 | 5.1 | FAIL |
| OVERALL | - | - | FAIL |

SEQUENTIALLY CHECK TIME POINT AT WHICH VERIFICATION WILL FAIL

TOKYO-PRINTER #1 AT TIME POINT OF 3/1

| VERIFICATION ITEM | TOLERANCE VALUE | PREDICTED VALUE | VERIFICATION RESULT |
|---|---|---|---|
| ΔE_AVERAGE | 4.0 | 2.9 | PASS |
| ΔE_MAXIMUM | 10.0 | 8.3 | PASS |
| ΔE_PRIMARY COLOR | 5.0 | 4.8 | PASS |
| OVERALL | - | - | PASS |

| PATCH No. | CMYK VALUES | | | | Lab VALUES | | |
|---|---|---|---|---|---|---|---|
| | C | M | Y | K | L* | a* | b* |
| 1 | 100 | 0 | 0 | 0 | 54.99 | -37.00 | -50.00 |
| 2 | 70 | 0 | 0 | 0 | 66.87 | -34.70 | -37.10 |
| 3 | 40 | 0 | 0 | 0 | 79.74 | -12.60 | -21.70 |
| 4 | 20 | 0 | 0 | 0 | 87.70 | -5.85 | -11.80 |
| 5 | 10 | 0 | 0 | 0 | 91.47 | -2.96 | -6.95 |
| 6 | 0 | 100 | 0 | 0 | 47.98 | 74.02 | -2.94 |
| 7 | 0 | 70 | 0 | 0 | 60.85 | 50.66 | -6.70 |
| 8 | 0 | 40 | 0 | 0 | 76.40 | 25.86 | -6.87 |
| 9 | 0 | 20 | 0 | 0 | 86.13 | 12.10 | -5.20 |
| 10 | 0 | 10 | 0 | 0 | 90.65 | 5.92 | -3.83 |
| 11 | 0 | 0 | 100 | 0 | 89.02 | -4.99 | 93.00 |
| 12 | 0 | 0 | 70 | 0 | 90.35 | -4.69 | 62.54 |
| 13 | 0 | 0 | 40 | 0 | 92.22 | -3.46 | 31.23 |
| 14 | 0 | 0 | 20 | 0 | 93.62 | -1.68 | 13.37 |
| 15 | 0 | 0 | 10 | 0 | 64.34 | -0.92 | 5.44 |
| 16 | 0 | 0 | 0 | 10 | 88.94 | -0.05 | -2.02 |
| 17 | 0 | 0 | 0 | 20 | 82.72 | -0.12 | -2.00 |
| 18 | 0 | 0 | 0 | 40 | 69.18 | -0.15 | -1.91 |
| 19 | 0 | 0 | 0 | 60 | 54.01 | -0.12 | -1.15 |
| 20 | 0 | 0 | 0 | 80 | 36.53 | -0.04 | -0.57 |
| ... | ... | ... | ... | ... | ... | ... | ... |
| 72 | 70 | 0 | 0 | 80 | 25.82 | -11.00 | -14.40 |

C

DRAWN →

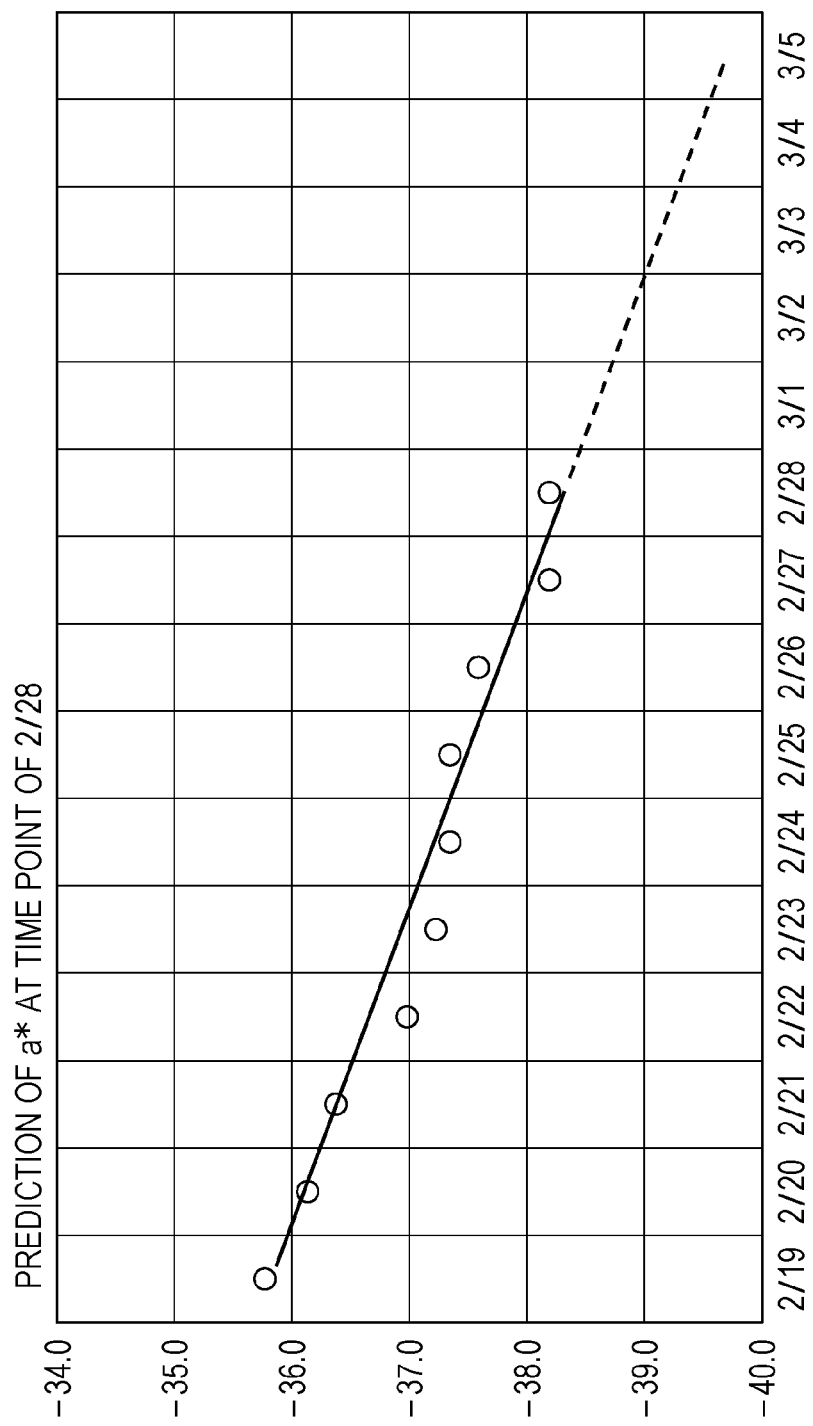

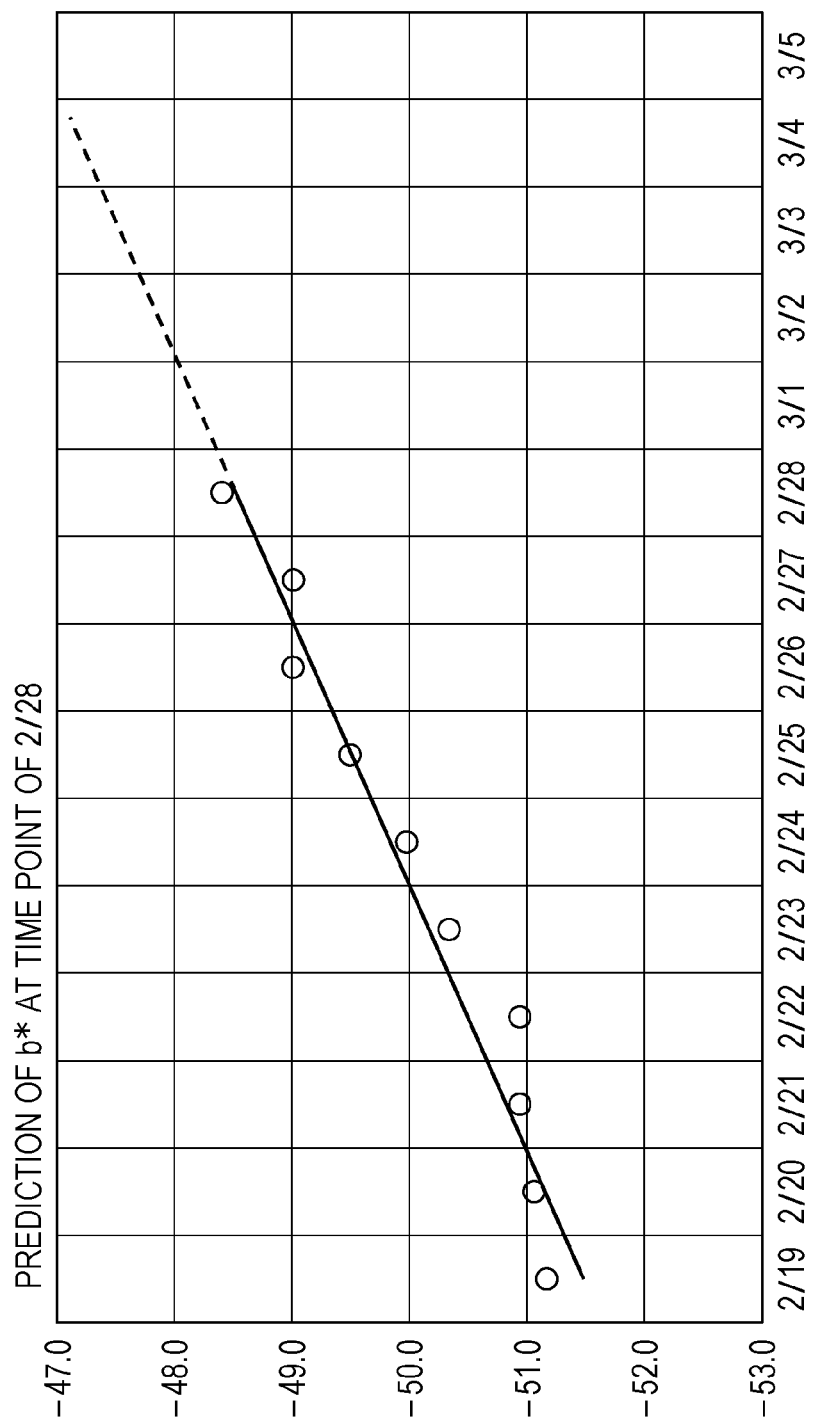

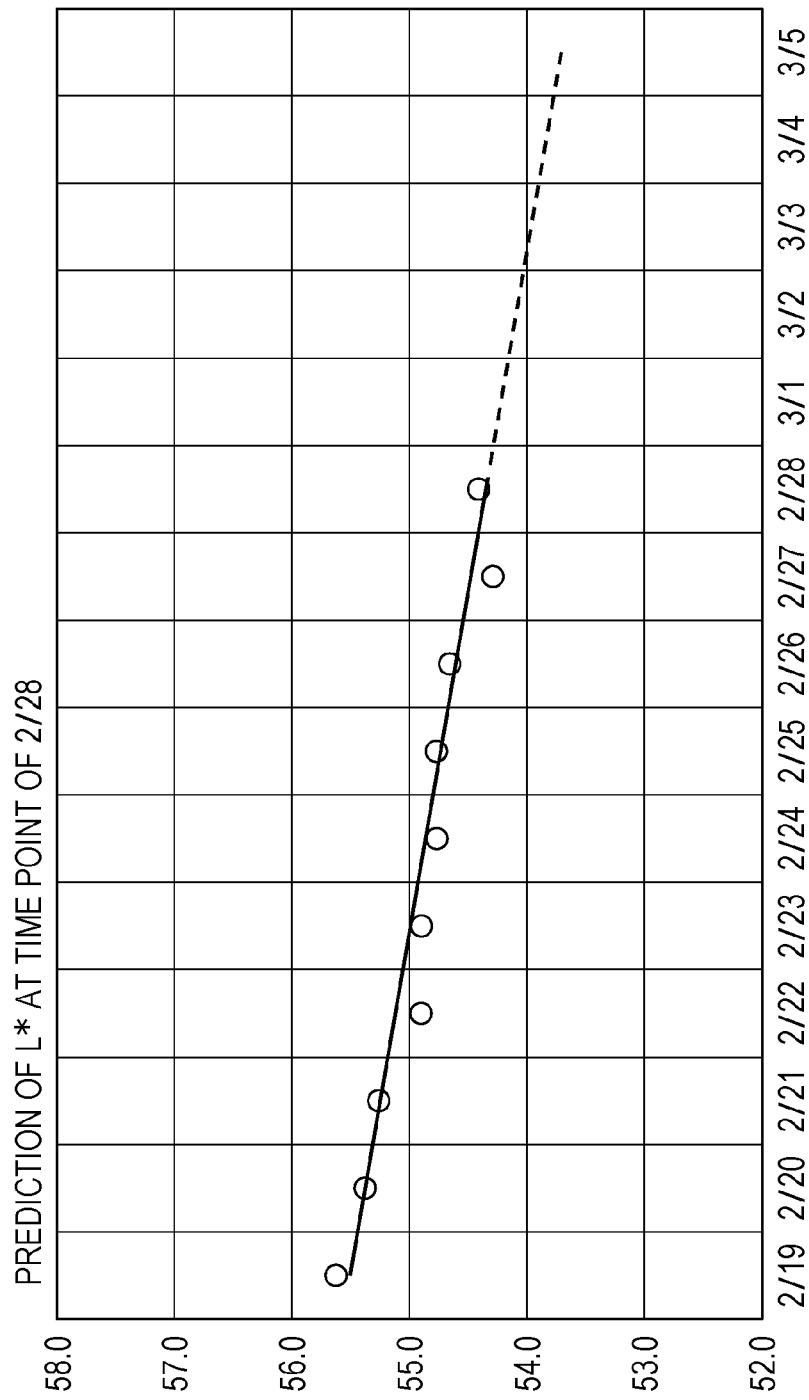

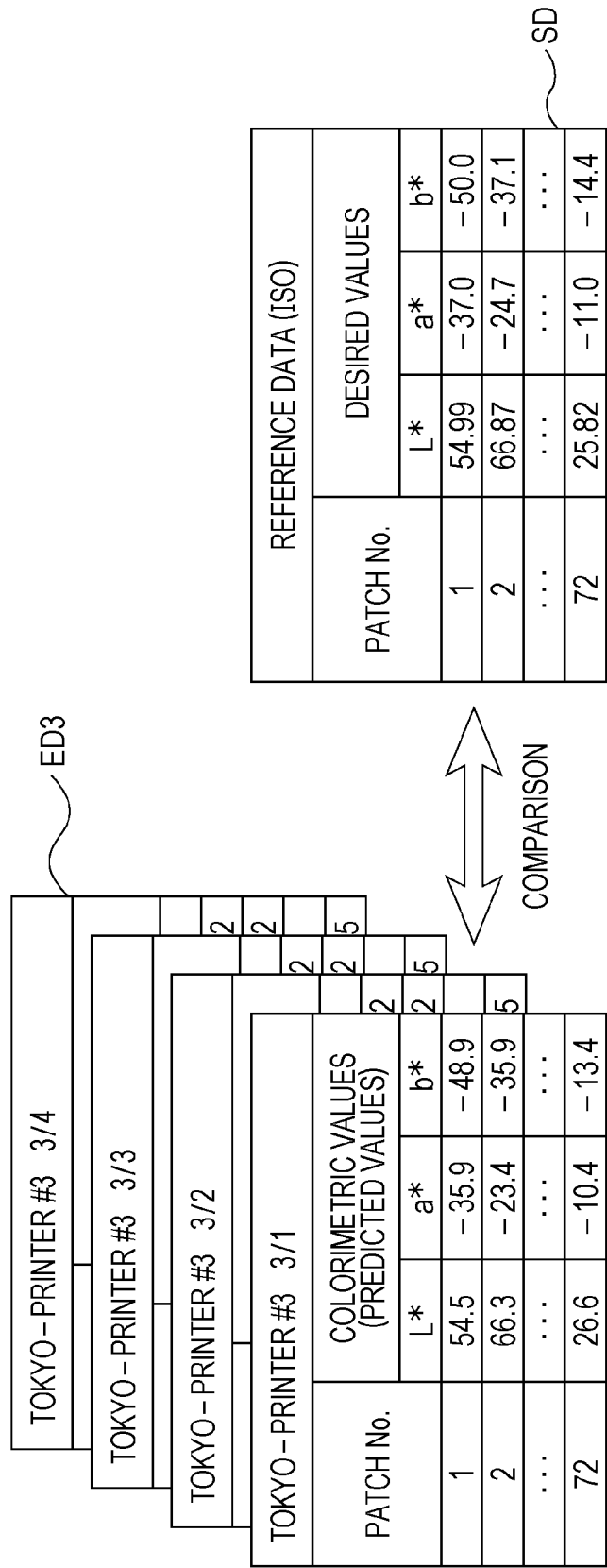

FIG. 9

TOKYO-PRINTER #1 AT TIME POINT OF 3/4

| VERIFICATION ITEM | TOLERANCE VALUE | PREDICTED VALUE | VERIFICATION RESULT |
|---|---|---|---|
| ΔE_AVERAGE | 4.0 | 3.1 | PASS |
| ΔE_MAXIMUM | 10.0 | 8.5 | PASS |
| ΔE_PRIMARY COLOR | 5.0 | 5.1 | FAIL |
| OVERALL | – | – | FAIL |

⋮

TOKYO-PRINTER #1 AT TIME POINT OF 3/1

| VERIFICATION ITEM | TOLERANCE VALUE | PREDICTED VALUE | VERIFICATION RESULT |
|---|---|---|---|
| ΔE_AVERAGE | 4.0 | 2.9 | PASS |
| ΔE_MAXIMUM | 10.0 | 8.3 | PASS |
| ΔE_PRIMARY COLOR | 5.0 | 4.8 | PASS |
| OVERALL | – | – | PASS |

↑ SEQUENTIALLY CHECK TIME POINT AT WHICH VERIFICATION WILL FAIL

FIG. 10

| COLOR ACCURACY VERIFICATION RESULT | | | |
|---|---|---|---|
| PRINTING SITE | TOKYO | | |
| TOKYO > | DEVICE NAME | LATEST RESULT | PREDICTED DATE OF FAIL OF VERIFICATION |
| OSAKA > | PRINTER #1 | PASS (2018/2/28) | 2018/3/4 |
| | PRINTER #3 | PASS (2018/2/28) | 2018/3/5 |
| | PRINTER #2 | PASS (2018/2/28) | 2018/3/7 |

D2

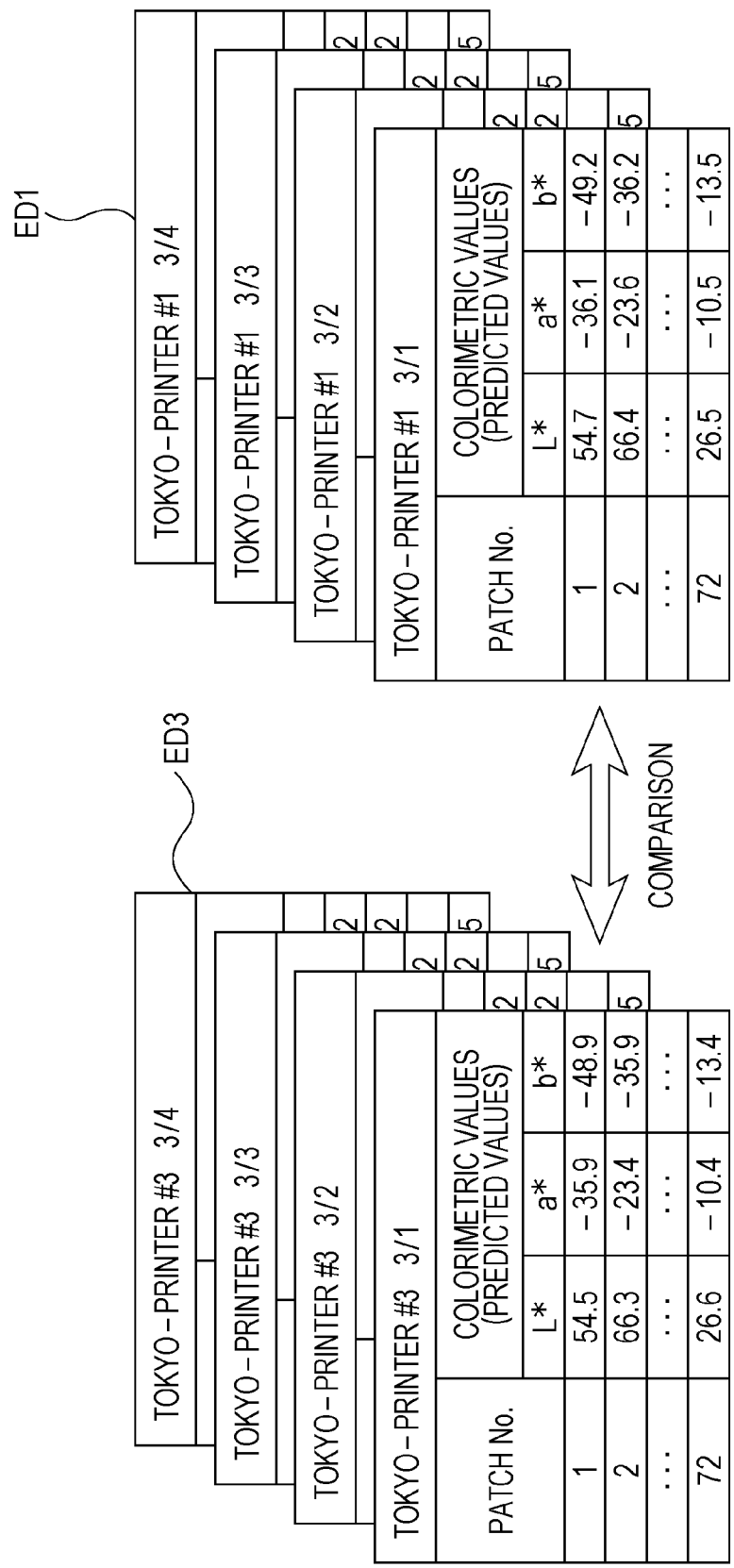

FIG. 13A

| TOKYO-PRINTERS #1 AND #2 AT TIME POINT OF 3/1 | | | |
|---|---|---|---|
| VERIFICATION ITEM | TOLERANCE VALUE | PREDICTED VALUE | VERIFICATION RESULT |
| ΔE_AVERAGE | 4.0 | 1.9 | PASS |
| ΔE_MAXIMUM | 10.0 | 2.5 | PASS |
| ΔE_PRIMARY COLOR | 5.0 | 2.1 | PASS |
| OVERALL | – | – | PASS |

(Stacked: TOKYO-PRINTERS #1 AND #2 AT TIME POINT OF 3/2, 3/3, 3/4)

FIG. 13B

| TOKYO-PRINTERS #2 AND #3 AT TIME POINT OF 3/1 | | | |
|---|---|---|---|
| VERIFICATION ITEM | TOLERANCE VALUE | PREDICTED VALUE | VERIFICATION RESULT |
| ΔE_AVERAGE | 4.0 | 1.8 | PASS |
| ΔE_MAXIMUM | 10.0 | 2.4 | PASS |
| ΔE_PRIMARY COLOR | 5.0 | 3.0 | PASS |
| OVERALL | – | – | PASS |

(Stacked: TOKYO-PRINTERS #2 AND #3 AT TIME POINT OF 3/2, 3/3, 3/4)

FIG. 13C

| TOKYO-PRINTERS #3 AND #1 AT TIME POINT OF 3/1 | | | |
|---|---|---|---|
| VERIFICATION ITEM | TOLERANCE VALUE | PREDICTED VALUE | VERIFICATION RESULT |
| ΔE_AVERAGE | 4.0 | 1.7 | PASS |
| ΔE_MAXIMUM | 10.0 | 2.3 | PASS |
| ΔE_PRIMARY COLOR | 5.0 | 2.9 | PASS |
| OVERALL | – | – | PASS |

(Stacked: TOKYO-PRINTERS #3 AND #1 AT TIME POINT OF 3/2, 3/3, 3/4)

FIG. 14

| TOKYO-PRINTERS #1, #2, AND #3 AT TIME POINT OF 3/3 | | | |
|---|---|---|---|
| VERIFICATION ITEM | TOLERANCE VALUE | PREDICTED VALUE | VERIFICATION RESULT |
| ΔE_AVERAGE | 4.0 | 3.1 | PASS |
| ΔE_MAXIMUM | 10.0 | 8.5 | PASS |
| ΔE_PRIMARY COLOR | 5.0 | 5.1 | FAIL |
| OVERALL | – | – | FAIL |

⋮

↑ SEQUENTIALLY CHECK TIME POINT AT WHICH VERIFICATION WILL FAIL

| TOKYO-PRINTERS #1, #2, AND #3 AT TIME POINT OF 3/1 | | | |
|---|---|---|---|
| VERIFICATION ITEM | TOLERANCE VALUE | PREDICTED VALUE | VERIFICATION RESULT |
| ΔE_AVERAGE | 4.0 | 2.9 | PASS |
| ΔE_MAXIMUM | 10.0 | 8.3 | PASS |
| ΔE_PRIMARY COLOR | 5.0 | 4.8 | PASS |
| OVERALL | – | – | PASS |

FIG. 15

| COLOR ACCURACY VERIFICATION RESULT | | | | |
|---|---|---|---|---|
| PRINTING SITE | TOKYO | | | |
| TOKYO > | DEVICE NAME | PREDICTED DATE OF FAIL OF VERIFICATION | | |
| OSAKA > | | VERIFICATION WITH RESPECT TO DESIRED VALUES | VERIFICATION BETWEEN PRINTERS | |
| | PRINTER #2 | 2018/3/4 | 2018/3/3 | |
| | PRINTER #3 | 2018/3/5 | | |
| | PRINTER #1 | 2018/3/7 | | |

| VERIFICATION REFERENCE SETTING |

SELECT VERIFICATION REFERENCE PRINTER AND
REFERENCE DATE AND PRESS OK

─ SELECTION OF VERIFICATION REFERENCE PRINTER ─

| PRINTING SITE | TOKYO |
|---|---|
| TOKYO > | |
| OSAKA > | |

| | DEVICE NAME |
|---|---|
| ☑ | PRINTER #1 |
| ☐ | PRINTER #2 |
| ☐ | PRINTER #3 |

― C21

─ SELECTION OF REFERENCE DATE ─

| 2018 | YEAR | 2 | MONTH | 26 | DAY |

― C22

OK   Cancel

| TOKYO-PRINTER #1  3/1 | | | |
|---|---|---|---|
| PATCH No. | COLORIMETRIC VALUES (PREDICTED VALUES) | | |
| | L* | a* | b* |
| 1 | 54.7 | -36.1 | -49.2 |
| 2 | 66.4 | -23.6 | -36.2 |
| ... | ... | ... | ... |
| 72 | 26.5 | -10.5 | -13.5 |

(TOKYO-PRINTER #1 3/2, TOKYO-PRINTER #1 3/3, TOKYO-PRINTER #1 3/4)

COMPARISON

BD:

| TOKYO-PRINTER #1  2/26 | | | |
|---|---|---|---|
| PATCH No. | REFERENCE COLORIMETRIC VALUES | | |
| | L* | a* | b* |
| 1 | 55.0 | -37.0 | -50.0 |
| 2 | 66.9 | -24.7 | -37.1 |
| ... | ... | ... | ... |
| 72 | 25.8 | -11.0 | -14.4 |

FIG. 18B

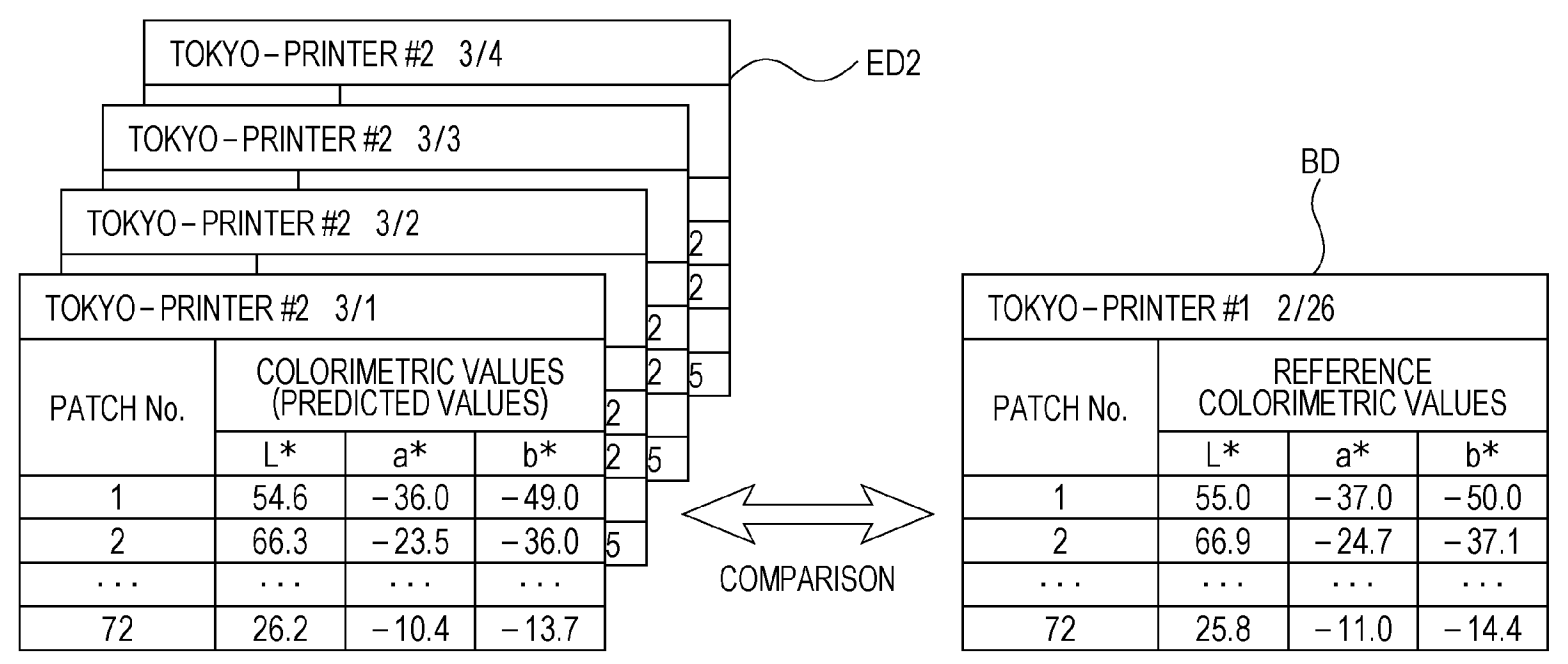

TOKYO-PRINTER #1  2/26

| PATCH No. | REFERENCE COLORIMETRIC VALUES | | |
|---|---|---|---|
| | L* | a* | b* |
| 1 | 55.0 | -37.0 | -50.0 |
| 2 | 66.9 | -24.7 | -37.1 |
| ... | ... | ... | ... |
| 72 | 25.8 | -11.0 | -14.4 |

BD

COMPARISON

ED2

TOKYO-PRINTER #2  3/4
TOKYO-PRINTER #2  3/3
TOKYO-PRINTER #2  3/2
TOKYO-PRINTER #2  3/1

| PATCH No. | COLORIMETRIC VALUES (PREDICTED VALUES) | | |
|---|---|---|---|
| | L* | a* | b* |
| 1 | 54.6 | -36.0 | -49.0 |
| 2 | 66.3 | -23.5 | -36.0 |
| ... | ... | ... | ... |
| 72 | 26.2 | -10.4 | -13.7 |

FIG. 18C

BD — TOKYO-PRINTER #1  2/26

| PATCH No. | REFERENCE COLORIMETRIC VALUES | | |
|---|---|---|---|
| | L* | a* | b* |
| 1 | 55.0 | −37.0 | −50.0 |
| 2 | 66.9 | −24.7 | −37.1 |
| ... | ... | ... | ... |
| 72 | 25.8 | −11.0 | −14.4 |

COMPARISON

ED3

TOKYO-PRINTER #3  3/4
TOKYO-PRINTER #3  3/3
TOKYO-PRINTER #3  3/2
TOKYO-PRINTER #3  3/1

| PATCH No. | COLORIMETRIC VALUES (PREDICTED VALUES) | | |
|---|---|---|---|
| | L* | a* | b* |
| 1 | 54.5 | −35.9 | −48.9 |
| 2 | 66.3 | −23.4 | −35.9 |
| ... | ... | ... | ... |
| 72 | 26.6 | −10.4 | −13.4 |

FIG. 19

| COLOR ACCURACY VERIFICATION RESULT | | | |
|---|---|---|---|
| PRINTING SITE | TOKYO | | |
| TOKYO > | DEVICE NAME | PREDICTED DATE OF FAIL OF VERIFICATION | |
| OSAKA > | | VERIFICATION WITH RESPECT TO DESIRED VALUES | VERIFICATION WITH RESPECT TO #1 (2/26) |
| | PRINTER #2 | 2018/3/4 | 2018/3/2 |
| | PRINTER #3 | 2018/3/5 | |
| | PRINTER #1 | 2018/3/7 | |

VERIFICATION REFERENCE SETTING

SELECT PRINT JOB TO SET PRINTERS USED FOR SELECTED PRINT JOB AND PRINT DATE AND TIME AS VERIFICATION REFERENCES.

— LIST OF PRINT JOBS —

PRINTING SITE 🏢 TOKYO

🏢 TOKYO >
🏢 OSAKA >

| | PRINT JOB NAME | PRINT DATE AND TIME | USED PRINTER |
|---|---|---|---|
| ☐ | APPLICATION GUIDELINE-94 | 2018/2/27 | PRINTERS #1, #2, #3 |
| ☑ | QUESTIONNAIRE -94 | 2018/2/27 | PRINTER #3 |
| ☐ | EXAMINATION QUESTIONS-94 | 2018/2/28 | PRINTERS #1, #2 |
| ☐ | ANSWER SHEET-94 | 2018/2/28 | PRINTERS #1, #2, #3 |
| ☐ | GREETING CARD-32 | 2018/2/28 | PRINTERS #1, #2 |

OK — B41
Cancel — B42

COLOR ACCURACY VERIFICATION WITH SPECIFIC PRINTER AS REFERENCE

COLOR ACCURACY VERIFICATION RESULT WITH SPECIFIC PRINTER AS REFERENCE IS DISPLAYED. SELECT VERIFICATION REFERENCE PRINTER AND REFERENCE DATE AND PRESS OK.

TIME-SERIES DISPLAY

PRINTING SITE  PRINTER NAME

TOKYO ▽    PRINTER #1 ▽

SELECTION OF REFERENCE DATE

2018 YEAR  2 MONTH  19 DAY

OK    Cancel

TIME-SERIES DISPLAY

SELECTION OF DISPLAY ITEM

ΔE_AVERAGE ▽

ΔE_AVERAGE (REFERENCE: TOKYO – PRINTER #1 2018/2/19)

ACCEPTANCE CRITERIA

1
2

2/19 2/20 2/21 2/22 2/23 2/24 2/25 2/26 2/27 2/28 3/1 3/2 3/3 3/4 3/5 3/6 3/7

D9

COLOR ACCURACY VERTFICATION DEVICE THAT MANAGES COLOR ACCURACY OF PLURALITY OF PRINTERS

CROSS-REFERENCE TO RELATED APPLICATIONS

This application claims priority from Japanese Patent Application No. 2018-157475 filed on Aug. 24, 2018, the entire contents of which are incorporated herein by reference.

TECHNICAL FIELD

The present invention relates to a color accuracy verification device, a color accuracy verification method, and a program that manages color accuracy of a plurality of printers.

BACKGROUND

In general, color management is regularly performed in color printers for commercial use to ensure constant color reproducibility. The color management is performed by carrying out color accuracy verification based on a desired color stipulated by the standard of International Standard Organization (ISO) or the like and the printing color actually printed by a printer, and checking that the color accuracy meets the acceptance criteria. The pass/fail of the color accuracy is determined based on, for example, the difference (color difference) between the color value of the desired color (desired value) and the color value of the printing color (colorimetric value).

When the color accuracy does not meet the acceptance criteria, it is necessary to re-create the printing profile or perform a correction work using the color correction function of the printer, in order to improve the color accuracy.

The correction work is carried out by a technician with sufficient knowledge and know-how; in many cases, however, such a technician is not stationed at every site of the printing company in which the printer is installed and visits each site as necessary to cope with. Therefore, there is a concern that man-hours will be wasted by carrying out the correction work, which is originally unnecessary, at the time of visit. In addition, when the color accuracy deteriorates before the time of the next visit, an unscheduled visit by the technician is required.

In order to carry out such a correction work efficiently, JP 2012-217054 A has proposed to carry out color accuracy verification of one printer at a plurality of printing time points to fix the cycle of carrying out the correction work based on the results of color accuracy verification, and also to display the history of verification results.

However, in a conventional color accuracy verification device as disclosed in JP 2012-217054 A, color accuracy verification is carried out only for one printer and color accuracy is merely managed, in which case deviations in color accuracy between a plurality of printers is not taken into account.

Therefore, when a plurality of printers shares one print job to execute in coordination, there is a possibility of having a difficulty in detecting a situation in which deterioration in color accuracy is expected in printed matters by an amount greater than the management upper limit. In addition, there is a possibility that the color accuracy does not meet the acceptance criteria between the first proof printed matter and the second proof printed matter when a print job executed in the past is re-executed (including both of a case where the same printer is used and a case where a different printer is used).

One or more embodiments provide a color accuracy verification device, a color accuracy verification method, and a program that support to ensure color accuracy of printed matters created by a plurality of printers by centrally managing color accuracy of the plurality of printers.

SUMMARY

A color accuracy verification device according to one or more embodiments of the present invention comprises: a hardware processor that: acquires a colorimetric value of each color patch of color accuracy verification charts formed by a plurality of printers; stores the colorimetric value in time series for each of the plurality of printers; sets a target printer for which color accuracy verification is to be carried out; and verifies color accuracy based on the colorimetric value of the target printer stored in the hardware processor and a verification reference value set in advance; and a display part that displays a verification result by the hardware processor for each of the target printers.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 7A to 7C are diagrams illustrating examples of prediction curves of colorimetric value fluctuations of one color patch;

FIGS. 8A to 8C are diagrams illustrating a color accuracy verification method according to one or more embodiments;

FIG. 9 is a diagram illustrating an example of a prediction result of color accuracy verification with respect to desired values;

FIG. 10 is a diagram illustrating a display example of color accuracy verification results according to one or more embodiments;

FIGS. 12A to 12C are diagrams illustrating a color accuracy verification method according to one or more embodiments;

FIGS. 13A to 13C are diagrams illustrating an example of a prediction result of color accuracy verification between two printers;

FIG. 14 is a diagram illustrating an example of a prediction result of color accuracy verification between target printers;

FIG. 15 is a diagram illustrating a display example of color accuracy verification results according to one or more embodiments;

FIG. 17 is a diagram illustrating an example of a setting screen for setting a verification reference of color accuracy verification;

FIGS. 18A to 18C are diagrams illustrating a color accuracy verification method according to one or more embodiments;

FIG. 19 is a diagram illustrating a display example of color accuracy verification results according to one or more embodiments;

FIG. 21 is a diagram illustrating another example of the setting screen for setting a verification reference;

FIG. 23 is a diagram illustrating another display example of color accuracy verification results according to one or more embodiments.

DETAILED DESCRIPTION

Hereinafter, one or more embodiments of the present invention will be described in detail with reference to the drawings. However, the scope of the invention is not limited to the disclosed embodiments.

Figure 1:
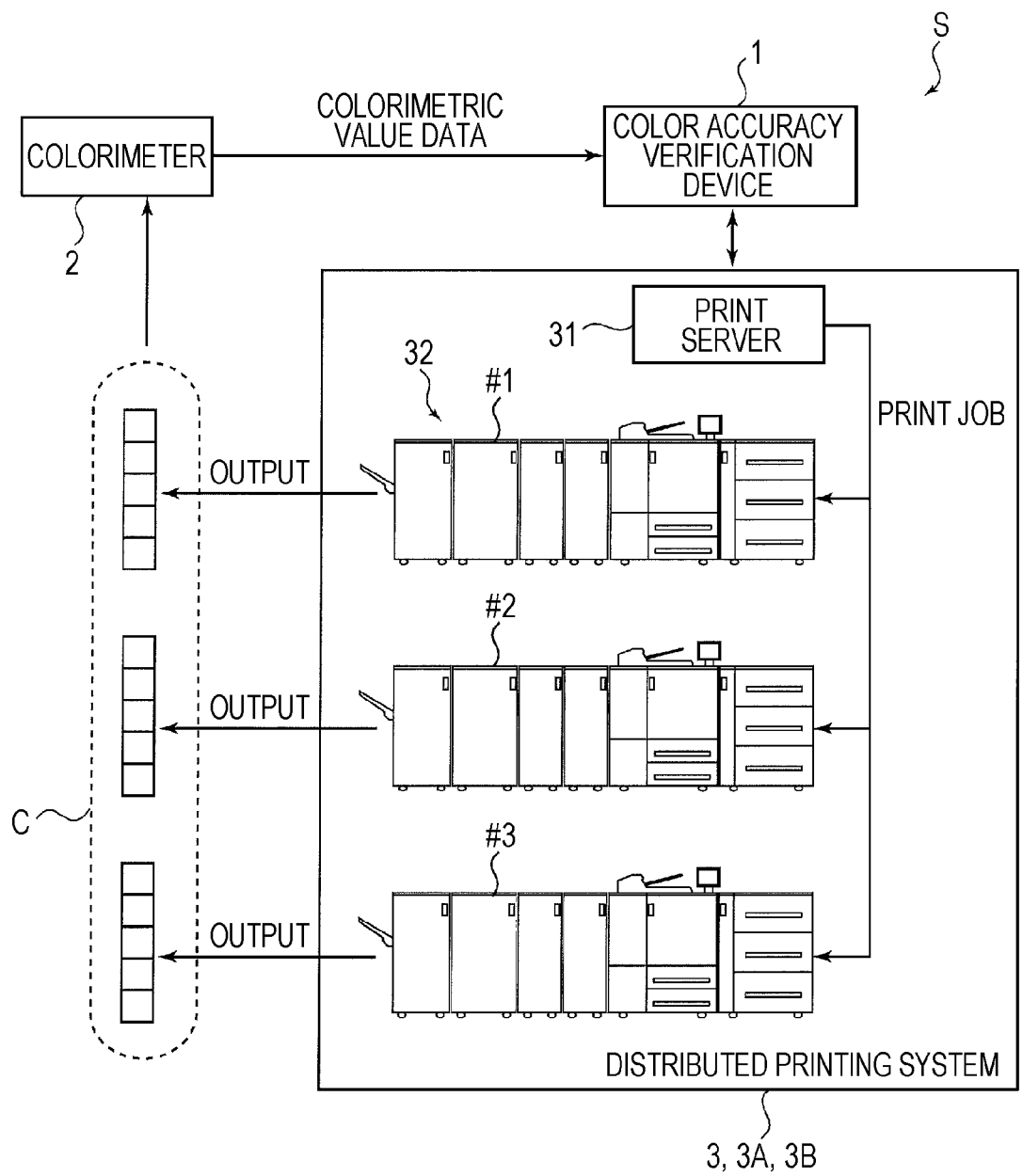
FIG. 1 is a diagram illustrating a schematic configuration of a color accuracy verification system including a color accuracy verification device according to one or more embodiments.

FIG. 1 is a diagram illustrating a schematic configuration of a color accuracy verification system S having a color accuracy verification device 1 according to one or more embodiments.

As illustrated in FIG. 1, the color accuracy verification system S includes the color accuracy verification device 1, a colorimeter 2, a distributed printing system 3, and the like. The colorimeter 2 and the distributed printing system 3 are connected to the color accuracy verification device 1 so as to be able to communicate with each other via a communication network such as the Internet. In the color accuracy verification system S, the distributed printing system 3 is provided at each printing site. The number of distributed printing systems 3 may be one or more than one. In one or more embodiments, a distributed printing system 3A is installed at a printing site in Tokyo and a distributed printing system 3B is installed at a printing site in Osaka as the distributed printing systems 3.

In one or more embodiments, the color accuracy verification device 1 centrally manages the color accuracy of a plurality of printers 32 constituting the distributed printing systems 3A and 3B.

The distributed printing systems 3A and 3B each include a print server 31 and the plurality of printers 32 (three printers in FIG. 1). The print server 31 and the respective printers 32 are connected so as to be able to communicate with each other via a communication network such as an intranet. In one or more embodiments, the print server 31 is configured so as to be able to communicate with the color accuracy verification device 1 and can transmit data and the like regarding the print job to the color accuracy verification device 1. When the plurality of printers 32 is distinguished in FIG. 1, the printers 32 are referred to as printers #1 to #3.

In the distributed printing systems 3A and 3B, for example, the print server 31 receives a print job from a client terminal (not illustrated) and divides the received print job in predetermined units (for example, copy units or page units) to instruct the plurality of printers 32 to perform distributed printing. The print job is described in a predetermined page description language (PDL) and includes, for example, data of an image object such as a figure or a photo and data of a text object such as a character or a symbol. According to the distributed printing systems 3A and 3B, since one print job is distributed to the plurality of printers 32 and printed, the required printing time and the printing waiting time can be shortened.

The print server 31 stores and manages data indicating information regarding the execution of the print job (hereinafter, referred to as "job execution data") in association with the print job. The job execution data includes print date and time at which the print job was executed (or scheduled execution date and time) and a printer that executed the print job.

For example, upon receiving the print job, the print server 31 creates a print schedule including scheduled execution date and time and a scheduled execution printer of the received print job, and transmits the created print schedule to the color accuracy verification device 1 as job execution data. The transmitted job execution data is stored in a storage part 14 in the color accuracy verification device 1 (see FIG. 3).

The printer 32 prints a color image on a sheet based on the print job (divided print job) from the print server 31 using an electrophotographic process technology. The printers 32 may include a monochrome printer. Note that the configurations of the print server 31 and the printer 32 are known and thus detailed description will be omitted. In addition, a multifunction machine having functions of a copier, a printer, a scanner, and the like may be applied instead of the printer 32.

The printer 32 regularly outputs a color accuracy verification chart C for color management. The printer 32 outputs the color accuracy verification chart C manually or automatically, for example, at the start of execution of a print job or at the startup of the printer 32 (when the power is turned on).

Figure 2:
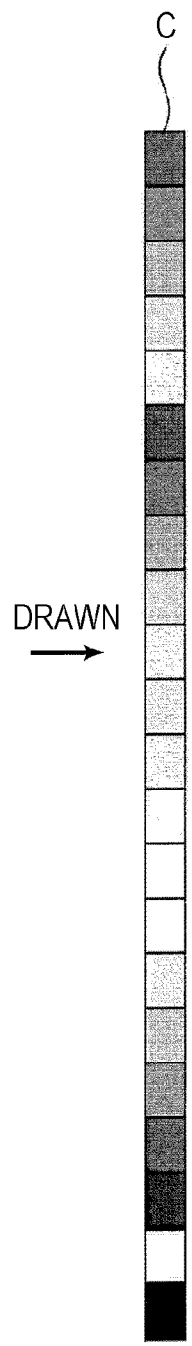
FIG. 2 is a diagram illustrating a color accuracy verification chart.

The color accuracy verification chart C is a color chart obtained by drawing a series of color patches (also referred to as color chips or color samples) in accordance with predefined color values (desired values) (see FIG. 2), and used for color accuracy verification of the printer 32. That is, as illustrated in FIG. 2, the correspondence between a patch number and color values as desired values (for example, CMYK values or L*a*b* values) is defined for each color patch.

The colorimeter 2 is, for example, a spectrocolorimeter that measures a color value based on the reflectance or transmittance of light of each wavelength. The colorimeter 2 is provided, for example, at each printing site and measures color values (for example, L*a*b* values) for each color patch on the color accuracy verification chart C output from the printer 32 to transmit data of the obtained color values (colorimetric value data) to the color accuracy verification device 1. The colorimetric value data includes color values of a series of color patches constituting the color accuracy verification chart C, in which the patch numbers are in correspondence to the measured color values (see FIG. 4).

The colorimeter 2 may be a portable colorimeter or an in-line colorimeter incorporated in the printer 32. The colorimeter 2 is connected to, for example, a computer terminal (not illustrated) and transmits the colorimetric value to the color accuracy verification device 1 via the computer terminal. Note that the color accuracy verification system S may be configured in such a manner that the colorimeter 2 is connected to the print servers 31 of the distributed printing systems 3A and 3B and the colorimetric value data is transmitted to the color accuracy verification device 1 via the print servers 31. In addition, when the color accuracy verification device 1 is installed at one of the printing sites, the colorimeter 2 may be configured so as to be directly connected to the color accuracy verification device 1 such that the color accuracy verification device 1 can acquire the colorimetric value data.

In the color accuracy verification system S, the color accuracy verification chart C is regularly output by the printers 32 of the distributed printing systems 3A and 3B and the color values of each color patch are measured by the colorimeter 2. The colorimetric value data is transmitted from the colorimeter 2 to the color accuracy verification device 1 and stored in the storage part 14 in the color accuracy verification device 1 (see FIG. 3). Note that details of the configuration of the color accuracy verification system S can be changed as appropriate.

Figure 3:
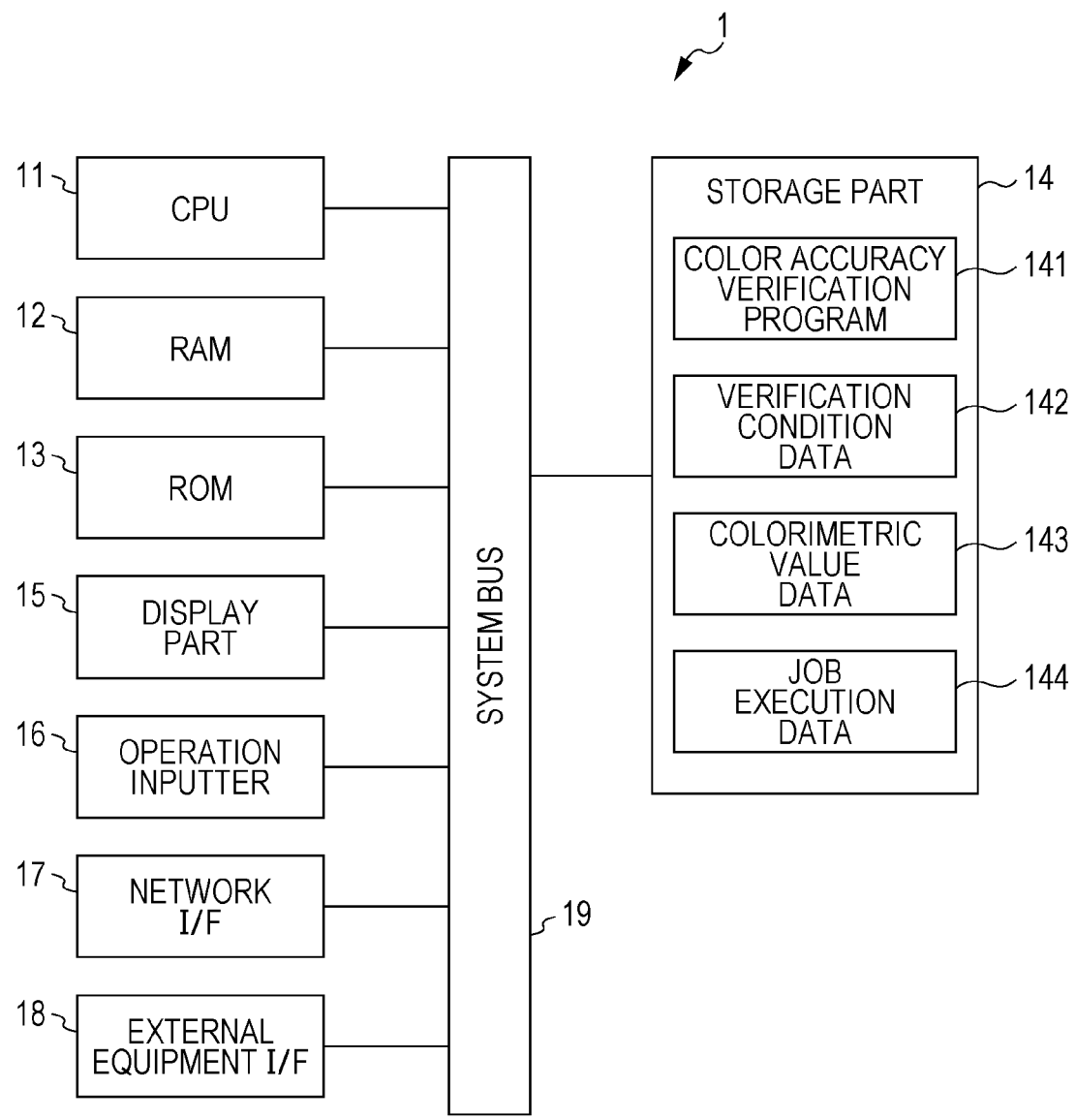
FIG. 3 is a diagram illustrating the configuration of the color accuracy verification device.

FIG. 3 is a diagram illustrating a hardware configuration of the color accuracy verification device 1.

As illustrated in FIG. 3, the color accuracy verification device 1 is formed by, for example, a general-purpose personal computer. That is, the color accuracy verification device 1 has a central processing unit (CPU) 11 as an arithmetic/control device, a random access memory (RAM) 12 and a read only memory (ROM) 13 as main storage devices, the storage part 14, a display part 15, an operation inputter 16, a network interface (I/F) 17, an external equipment I/F 18, and the like. Each of the units 12 to 18 is connected to the CPU 11 via a system bus 19.

The ROM 13 stores, for example, a basic program such as a basic input/output system (BIOS) and basic setting data. The CPU 11 reads out a program according to the processing content from the storage part 14 to develop the read-out program in the RAM 12 and executes the developed program to implement each function of the color accuracy verification device 1.

Note that a part or all of the processes executed by the CPU 11 may be executed by an electronic circuit such as a digital signal processor (DSP), an application specific integrated circuit (ASIC), or a programmable logic device (PLD) provided according to processes.

The storage part 14 is, for example, an auxiliary storage device such as a nonvolatile semiconductor memory (so-called flash memory) or a hard disk drive. The storage part 14 may include a disk drive that drives an optical disc such as a compact disc (CD) or a digital versatile disc (DVD), or a magneto-optical disk (MO) to read and write information, or may include a universal serial bus (USB) memory or a memory card such as an SD card. Furthermore, a storage area on a cloud connected via the network I/F 17 may be applied as the storage part 14.

In one or more embodiments, the storage part 14 stores a color accuracy verification program 141, verification condition data 142, colorimetric value data 143, and job execution data 144.

The display part 15 is formed by, for example, a liquid crystal display, an organic electro luminescence (EL) display, or a cathode ray tube (CRT) display. The display part 15 displays various setting screens, a color accuracy verification result screen, and the like in accordance with instructions from the CPU 11.

The operation inputter 16 includes various operation keys such as a numeric keypad and a start key, and a pointing device such as a mouse, and accepts various input operations by a user to output operation signals to the CPU 11. The user can set, for example, a printer for which color accuracy verification is to be carried out by operating the operation inputter 16. Note that the display part 15 and the operation inputter 16 may be integrally provided by, for example, a flat panel display with a touch panel.

The network I/F 17 is an interface for communicating with external equipment via a communication network such as the Internet. The CPU 11 can transmit and receive various types of information to and from external equipment (for example, the colorimeter 2 and the distributed printing systems 3A and 3B) connected to the communication network via the network I/F 17.

The external equipment I/F 18 is an interface, for example, for connecting external equipment via a communication bus such as a universal serial bus (USB). The CPU 11 can transmit and receive various types of information to and from external equipment (for example, the colorimeter 2) connected to the external equipment I/F.

Figure 4:
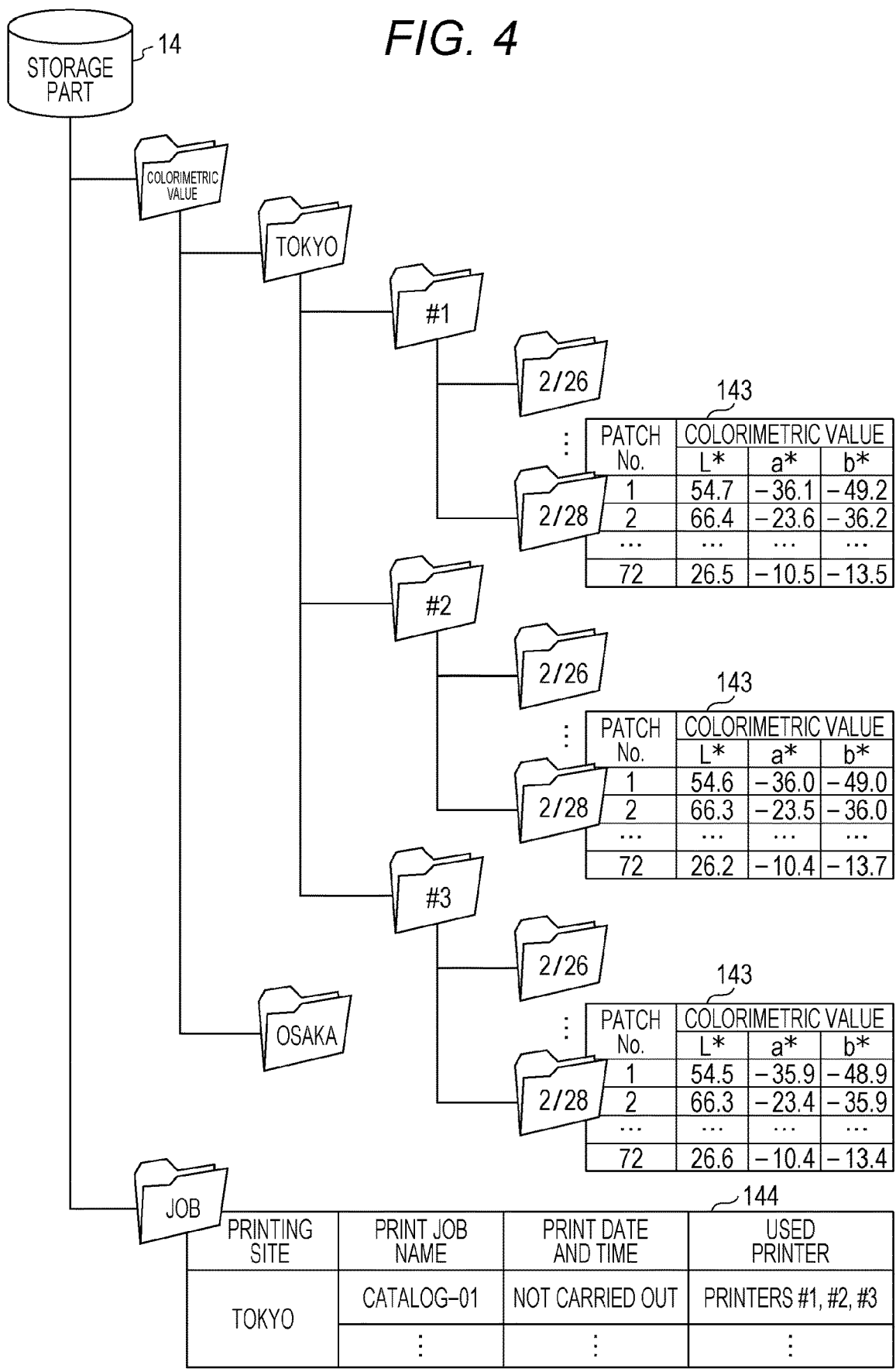
FIG. 4 is a diagram illustrating an example of a data configuration of data stored in a storage part.

FIG. 4 is a diagram illustrating an example of a data configuration of data (the colorimetric value data 143 and the job execution data 144) stored in the storage part 14.

As illustrated in FIG. 4, the colorimetric value data 143 is stored in time series for each printer 32. In one or more embodiments, the colorimetric value data 143 is classified by printing sites in Tokyo and Osaka, and further classified by the printers 32 installed in each printing site, to be stored in time series. In FIG. 4, the colorimetric value data 143 measured on February 26 to February 28 is kept for each of printers #1 to #3 installed at the printing site in Tokyo. When color accuracy verification (including prediction) is performed in the color accuracy verification device 1, the colorimetric value data 143 is referred to. Note that the colorimetric value data 143 only needs to include data after the correction work for improving the color accuracy is performed, and the past data may be appropriately overwritten or deleted.

The job execution data 144 is stored in correspondence to a print job name, print date and time, and a printer. In one or more embodiments, the job execution data 144 is stored for each printing site. As an example of the job execution data 144, FIG. 4 indicates that a print job whose print job name is "catalog-01" is "not carried out" and scheduled to be executed by "printers #1 to #3" installed at the printing site in Tokyo. In the color accuracy verification device 1, the job execution data 144 is referred to when settings on a target printer for which color accuracy verification is to be carried out and a reference printer serving as a reference of color accuracy verification are made.

The color accuracy verification device 1 verifies the color accuracy based on colorimetric values of the target printer selected from among the plurality of printers 32 constituting the distributed printing system 3 and verification reference values set in advance. In one or more embodiments, the color accuracy verification device 1 verifies the color accuracy with respect to the desired values (color values defined in a verification condition) for the target printer, and also verifies (predicts) the future color accuracy with respect to the desired values based on the transition of the colorimetric values, to display the verification result for each target printer. That is, in one or more embodiments, color accuracy verification is performed using the desired values defined in the verification condition as verification reference values. Specifically, a color accuracy verification process 1 according to one or more embodiments is executed in accordance with a flowchart illustrated in FIG. 5.

Figure 5:
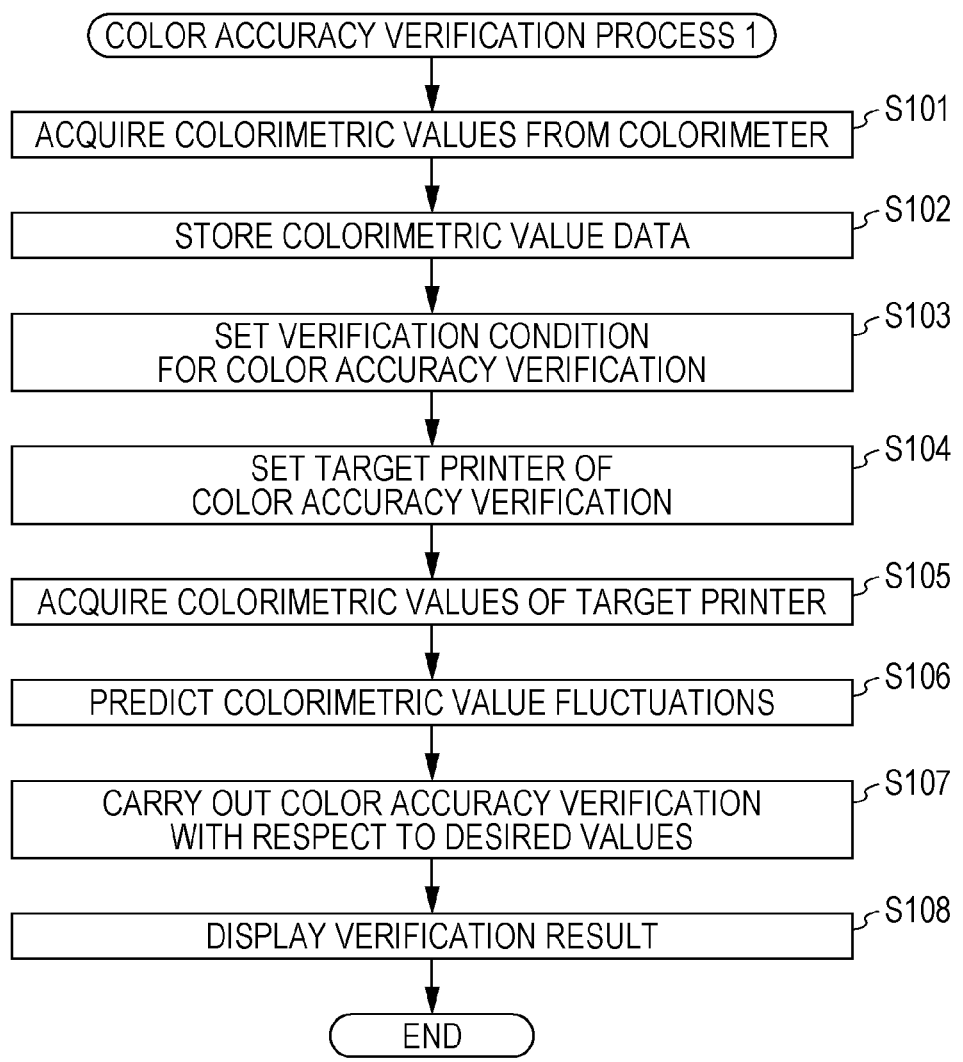
FIG. 5 is a flowchart illustrating an example of a color accuracy verification process according to one or more embodiments.

FIG. 5 is a flowchart illustrating an example of the color accuracy verification process 1 according to one or more embodiments. This process is implemented by the CPU 11 executing the color accuracy verification program 141 kept in the storage part 14. In one or more embodiments, the CPU 11 cooperates with the other units 12 to 18 of the color accuracy verification device 1 to function as a colorimetric value data acquirer, a colorimetric value data storage part, a verification condition setter, a target printer setter, a colorimetric value predictor, a color accuracy verifier, and a display controller.

In step S101, the CPU 11 acquires colorimetric values of each color patch of the color accuracy verification charts C formed by the plurality of printers 32 via the network I/F 17 (a process as the colorimetric value data acquirer). In addition, in step S102, the CPU 11 stores the colorimetric values acquired in step S101 in the storage part 14 in time series for each of the plurality of printers 32 (a process as the colorimetric value data storage part).

The processes in steps S101 and S102 are appropriately performed when, for example, each color patch of the color accuracy verification chart C is measured by the colorimeter 2 and the colorimetric values are transmitted to the color accuracy verification device 1. In one or more embodiments, a case will be described in which colorimetric values of February 19 to February 28 after the correction work are acquired and stored in the storage part 14 in steps S101 and S102.

Figure 6:
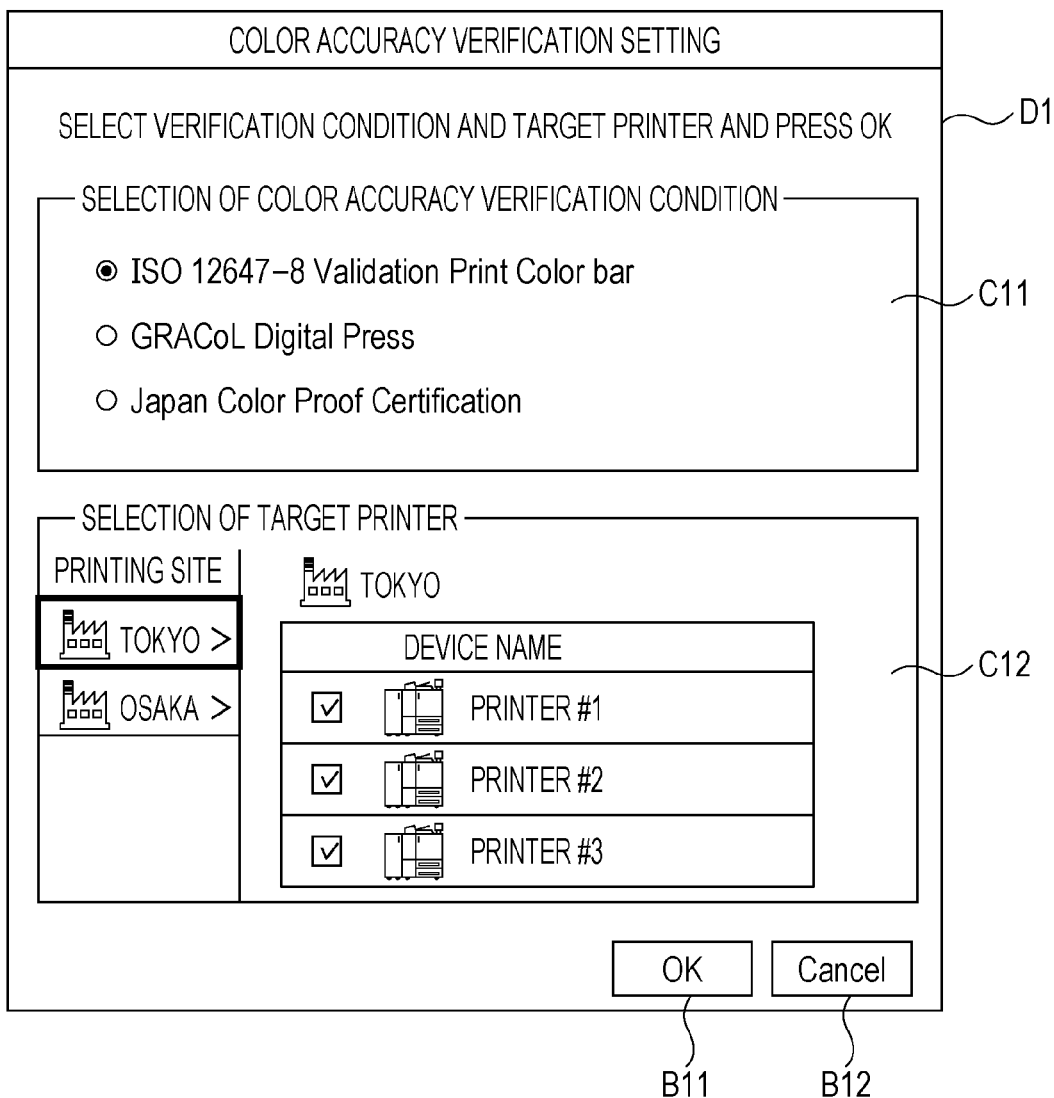
FIG. 6 is a diagram illustrating an example of a setting screen for setting a verification condition and a target printer of color accuracy verification.

In step S103, the CPU 11 sets a verification condition for color accuracy verification (a process as the verification condition setter). In step S104, the CPU 11 also sets a target printer for which color accuracy verification is to be carried out (a process as the target printer setter). For example, the CPU 11 displays a setting screen D1 as illustrated in FIG. 6 on the display part 15 in response to an operation to start color accuracy verification and, based on an operation to the operation inputter 16 on the displayed setting screen D1, sets the verification condition and the target printer. In one or more embodiments, a case will be described in which "ISO 12647-8 Validation Print Color bar" is set as a validation condition and the printers #1 to #3 installed in the distributed printing system 3A at the site in Tokyo are set as target printers in steps S103 and S104.

FIG. 6 is a diagram illustrating an example of a setting screen for setting the verification condition and the target printer of color accuracy verification.

In a setting screen D1 illustrated in FIG. 6, a selection item C11 of "selection of color accuracy verification condition" for setting the verification condition for color accuracy verification, and a selection item C12 of "selection of target printer" for selecting a target printer for which color accuracy verification is to be carried out are arranged. In addition, in the lower part of the setting screen D1, operation buttons B11 and B12 for fixing or canceling the selection in the selection items C11 and C12 are arranged.

In the setting screen D1, a list of selectable color accuracy verification conditions is displayed in the selection item C11. The color accuracy verification condition includes, for example, color values (desired values) serving as references for each color patch, verification items, and a tolerance value for each verification item, and is stored in the storage part 14 as the verification condition data 142. For example, in "ISO 12647-8 Validation Print Color bar", which is a color accuracy verification condition prescribed in ISO 12647-8, an average value of color differences $\Delta E$ for each color patch ($\Delta E\_average$), a maximum value of the color differences $\Delta E$ ($\Delta E\_maximum$), and color differences $\Delta E$ of the primary colors (CMY) ($\Delta E\_primary$ color) are used as verification items, and a tolerance value for each item is prescribed. The color difference $\Delta E$ indicates the linear distance between colors of the colorimetric values and the desired values in the Lab color space.

In FIG. 6, color accuracy verification conditions prescribed in ISO12647-8, GRACol, and Japan Color are selectable, and "ISO 12647-8 Validation Print Color bar" is being selected. The user can set a wanted color accuracy verification condition in the selection item C11.

In the setting screen D1, a list of printers treated as management targets of the color accuracy verification system S is displayed in the selection item C12. The user can set a target printer of color accuracy verification in the selection item C12. The user sets, for example, the printers 32 used for distributed printing as target printers in order to grasp the color accuracy between the printers in a case where distributed printing is performed. In FIG. 6, among the printers 32 treated as management targets of the color accuracy verification system S, the printers #1 to #3 installed in the distributed printing system 3A at the site in Tokyo are displayed, and all the printers #1 to #3 are being selected as the target printers of color accuracy verification.

After the verification condition and the target printers of the color accuracy verification are set in steps S103 and S104 in FIG. 5, in step S105, the CPU 11 reads out data corresponding to the target printers from among pieces of the colorimetric value data 143 for respective printers stored in the storage part 14 (see FIG. 4).

In step S106, the CPU 11 analyzes the colorimetric value data read out in step S105 and predicts future colorimetric value fluctuations for each of the color patches constituting the color accuracy verification chart C for each of the target printers (a process as the colorimetric value predictor).

FIGS. 7A to 7C are diagrams illustrating examples of prediction results of colorimetric value fluctuations of one color patch. FIGS. 7A to 7C illustrate fluctuations of an a* value, fluctuations of a b* value, and fluctuations of an L* value of a color patch with the patch No. 1 (cyan 100%), respectively. In addition, FIGS. 7A to 7C indicate the results of predicting the colorimetric values of March 1 to March 5 on the basis of the colorimetric value data of February 19 to February 28 obtained after the correction work.

As illustrated in FIGS. 7A to 7C, the colorimetric value fluctuations can be predicted, for example, using the following procedure. That is, the actual measurement values of the colorimetric values acquired from the most recently performed correction to the present (from February 19 to February 28 in FIGS. 7A to 7C) are plotted in time series (○ marks in FIGS. 7A to 7C). Then, an average value in a predetermined time range is taken and a smoothed moving average is calculated (solid lines in FIGS. 7A to 7C). Based on this moving average, a prediction curve is calculated (broken lines in FIGS. 7A to 7C). The colorimetric values after March 1 can be predicted based on the prediction curve.

Note that, on the basis of the actual measurement values of colorimetric values, the prediction curve may be calculated by, for example, applying a variety of functions including linear form, polynomial, exponential function, logarithmic function, or power function, and then fixing a parameter that specifies the shape of the function using a known technique such as the least squares method, the steepest descent method, or the Newton method.

Colorimetric value fluctuations are similarly predicted for all color patches of the color accuracy verification chart C. In addition, colorimetric value fluctuations are similarly predicted for other printers selected as the target printers. As described above, predicted data of colorimetric values is obtained for each target printer.

After colorimetric value fluctuations are predicted in step S106 in FIG. 5, in step S107, the CPU 11 verifies the current color accuracy with respect to the desired values based on the current data of the colorimetric values (the colorimetric value data of February 28) for each target printer, and also verifies (predicts) the future color accuracy based on the predicted data of the colorimetric values (a process as the color accuracy verifier).

The current color accuracy with respect to the desired values is verified by, for example, calculating the color difference ΔE between the current data for each color patch and the reference data (desired values) defined in the set color accuracy verification condition, and determining the pass/fail for each verification item. When "ISO 12647-8 Validation Print Color bar" is set as the color accuracy verification condition, the verification will pass if the acceptance criteria, namely, the average value of the color differences ΔE for each color patch (ΔE_average) falling within ±4.0, the maximum value of the color differences ΔE (ΔE_maximum) falling within ±10.0, and the color differences ΔE of primary colors (CMY) (ΔE_primary color) falling within ±5.0 are met, while the verification will fail if the acceptance criteria are not met.

Figure 8A:
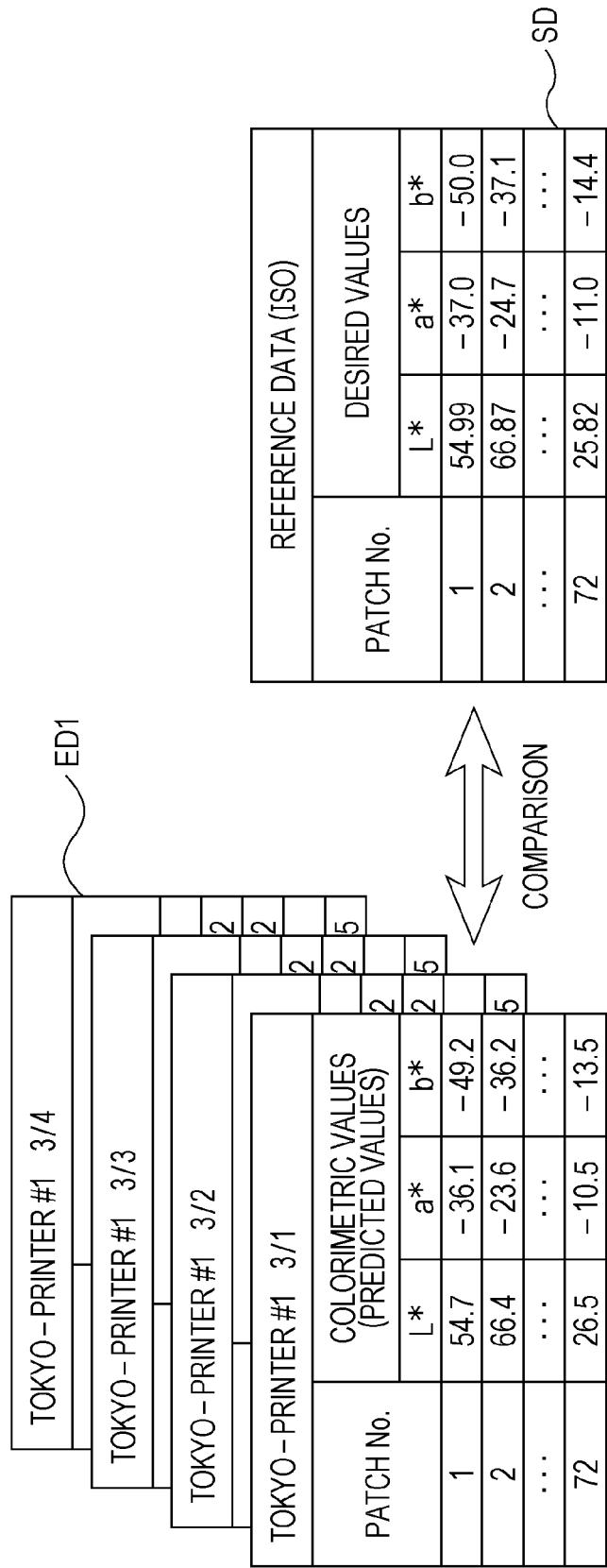
Figure 8B:
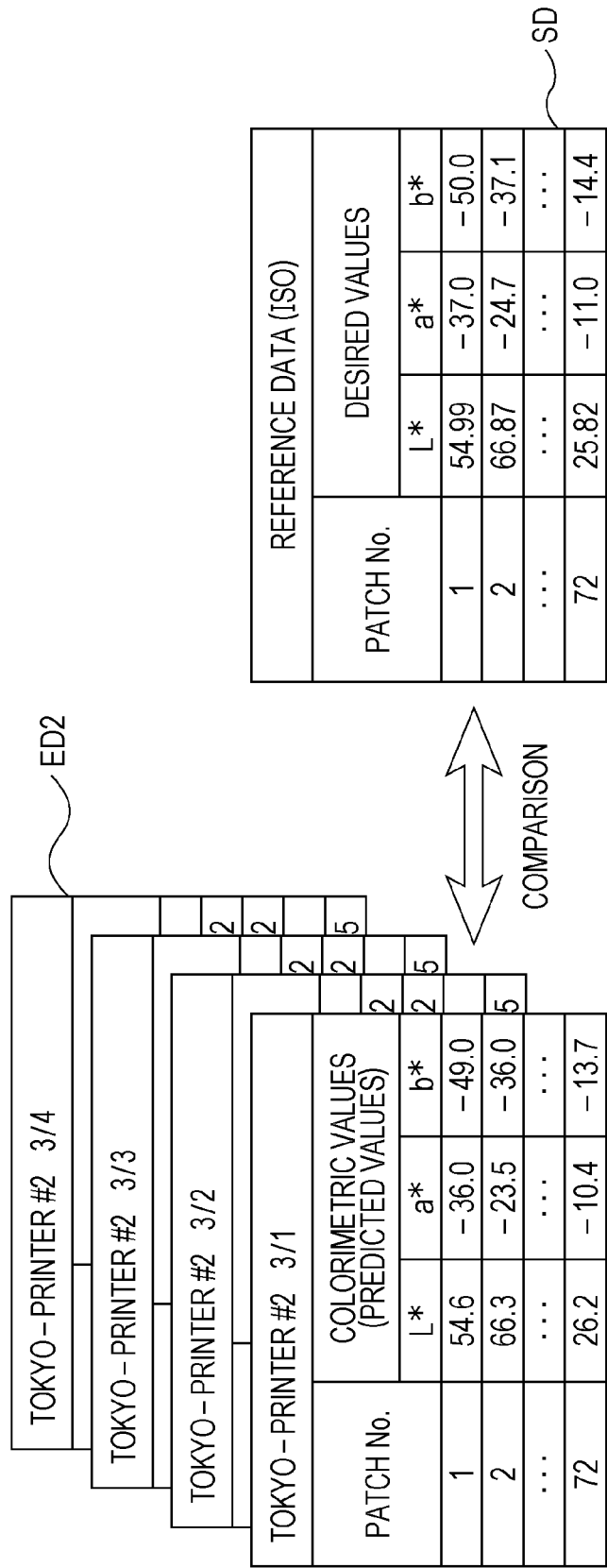

The future color accuracy with respect to the desired values is similarly verified. That is, as illustrated in FIGS. 8A to 8C, the pass/fail is determined for each verification item using the color differences ΔE calculated by comparing predicted data ED1 to predicted data ED3 for each color patch acquired in step S106 with reference data SD (desired values) defined in the set color accuracy verification condition. The acceptance criteria are similar to the case of the current color accuracy verification with respect to the desired values. Note that the numerical values of the predicted data ED1 to the predicted data ED3 of March 1 illustrated in FIGS. 8A to 8C are merely examples and are not linked to the prediction curves illustrated in FIGS. 7A to 7C.

Specifically, the color accuracy is verified in ascending order of dates from predicted data of a date closest to the current time point (for example, the predicted data of March 1), and a predicted date at which the verification will fail is extracted (see FIG. 9). In FIG. 9, at the time point of March 1, since all of the ΔE_average, ΔE_maximum, and ΔE_primary color meet the acceptance criteria, the color accuracy verification result is regarded as "pass". On the other hand, at the time point of March 4, since the ΔE_average and the ΔE_maximum meet the acceptance criteria, but the ΔE_primary color does not meet the acceptance criteria, the color accuracy verification result is regarded as "fail".

After color accuracy verification is carried out in step S107, the CPU 11 displays the color accuracy verification result on the display part 15 in step S108 (a process as the display controller). The color accuracy verification result includes the prediction result of the future color accuracy verification with respect to the desired values.

FIG. 10 is a diagram illustrating a display example of color accuracy verification results according to one or more embodiments.

In a verification result screen D2 illustrated in FIG. 10, "latest result", which is the current color accuracy verification result, and "predicted date of fail of verification", which is the prediction result of the color accuracy verification, are displayed for each target printer of color accuracy verification. In FIG. 10, predicted dates at which the verification result with respect to the desired values will fail are placed in the order of dates from a date closest to the present at the top.

Note that, since it can be learned that the current color accuracy verification result is a pass from the "predicted date of fail of verification", "latest result", which is the current color accuracy verification result, may be omitted. In this case, the current color accuracy verification result is deemed to be displayed as the "predicted date of fail of verification".

On the verification result screen D2 illustrated in FIG. 10, the user can learn that the current color accuracy verification results (at the time point of February 28) of the printers #1 to #3 are "pass", and the color accuracy verification result will fail on March 4 for the printer #1, on March 5 for the printer #3, and on March 7 for the printer #2. Then, in a case where the scheduled execution date of the distributed printing performed using the printers #1 to #3 is March 4 or later, the user can find out that a correction work for improving the color accuracy is necessary before the scheduled execution date of the distributed printing.

That is, by referring to the verification result screen D2, it can be found out whether or not the color accuracy in the printed matter is ensured when the same print job is executed.

As described above, the color accuracy verification device 1 according to one or more embodiments includes: the network I/F 17 (colorimetric value data acquirer) that acquires the colorimetric values of each color patch of the color accuracy verification charts C formed by the plurality of printers 32; the storage part 14 (colorimetric value data storage part) that stores the colorimetric values in time series for each of the plurality of printers 32; the CPU 11 (target printer setter) that sets a target printer for which color accuracy verification is to be carried out; the CPU 11 (color accuracy verifier) that verifies the color accuracy based on the colorimetric values of the target printer stored in the colorimetric value data storage part and the verification reference values set in advance; and the display part 15 that displays the verification result by the color accuracy verifier for each target printer.

In addition, the color accuracy verification method according to one or more embodiments includes: a phase of acquiring the colorimetric values of each color patch of the color accuracy verification charts C formed by the plurality of printers 32 (step S101 in FIG. 5); a phase of storing the colorimetric values in time series for each of the plurality of printers 32 (step S102); a phase of setting a target printer for which color accuracy verification is to be carried out (step S104); a phase of verifying the color accuracy based on the colorimetric values of the target printer and the verification reference values set in advance (step S107); and a phase of displaying the verification result for each target printer (step S108).

Furthermore, the color accuracy verification program 141 according to one or more embodiments causes the color accuracy verification device 1 (computer) to execute: a process of acquiring the colorimetric values of each color patch of the color accuracy verification charts C formed by the plurality of printers 32 (step S101 in FIG. 5); a process of storing the colorimetric values in time series for each of the plurality of printers 32 (step S102); a process of setting a target printer for which color accuracy verification is to be carried out (step S104); a process of verifying the color accuracy based on the colorimetric values of the target printer and the verification reference values set in advance (step S107); and a process of displaying the verification result for each target printer (step S108).

This color accuracy verification program 141 is provided, for example, via a computer-readable portable storage medium (including an optical disc, a magneto-optical disk, and a memory card) in which the program is kept. In addition, for example, the color accuracy verification program 141 may be provided by download from a server holding the program via a network.

According to the color accuracy verification device 1, the color accuracy verification method, and the color accuracy verification program 141 of one or more embodiments, the color accuracy of printed matters created by the plurality of printers 32 is properly ensured by centrally managing the color accuracy of the plurality of printers 32.

Specifically, in the color accuracy verification device 1 according to one or more embodiments, the CPU 11 (color accuracy verifier) reads out colorimetric values corresponding to the target printer from the storage part 14 (colorimetric value data storage part), and verifies the color accuracy for each target printer based on the color differences ΔE (differences) between the colorimetric values and the desired values prescribed for each color patch.

With this process, the color accuracy of the target printer with respect to the desired values is centrally managed with ease.

The color accuracy verification device 1 according to one or more embodiments also includes the CPU 11 (colorimetric value predictor) that predicts future colorimetric values based on the time-series fluctuations of the colorimetric values stored in the storage part 14 (colorimetric value data storage part), and the CPU 11 (color accuracy verifier) verifies the future color accuracy for each target printer based on the differences between the predicted colorimetric values and the verification reference values.

Specifically, in the color accuracy verification device 1 according to one or more embodiments, the CPU 11 (color accuracy verifier) verifies the future color accuracy for each target printer based on the color differences ΔE (differences) between the predicted colorimetric values and the desired values prescribed for each color patch.

With this process, the color accuracy of the target printer with respect to the desired values including the future prediction result is centrally managed with ease. Accordingly, when a plurality of printers shares one print job to execute in coordination, such as at the distributed printing, or when a print job executed in the past is re-executed, the color accuracy of the printed matter is reliably maintained constant owing to the printer correction work carried out at an appropriate timing and frequency, while waste of resources and man-hours due to unneeded correction work is preferably prevented.

In addition, in the color accuracy verification device according to one or more embodiments, the plurality of printers 32 constitutes the distributed printing system 3 that distributes one print job to print.

With this configuration, since the color accuracy of the printers that execute the same print job in the distributed printing system 3 is centrally managed with ease, it is allowed to confirm beforehand whether or not the color tones between the printed matters will coincide with each other and to create high quality printed matters.

Furthermore, the color accuracy verification device 1 according to one or more embodiments includes the CPU 11 (verification condition setter) that sets the verification condition for color accuracy, and the CPU 11 (color accuracy verifier) verifies the color accuracy based on the set verification condition.

This makes it easier to grasp the color accuracy conforming to a standard designated in the print job or the like.

In one or more embodiments, a color accuracy verification device 1 verifies the color accuracy between the target printers and also verifies (predicts) the future color accuracy between the target printers based on the transition of the colorimetric values, to display the verification result. That is, in one or more embodiments, the color accuracy of one target printer is verified using colorimetric values of another target printer as verification reference values. Specifically, a color accuracy verification process 2 according to one or more embodiments is executed in accordance with a flowchart illustrated in FIG. 11.

Note that, since the configuration of a color accuracy verification system S is similar to the configuration of the other embodiments, the description will be omitted.

Figure 11:
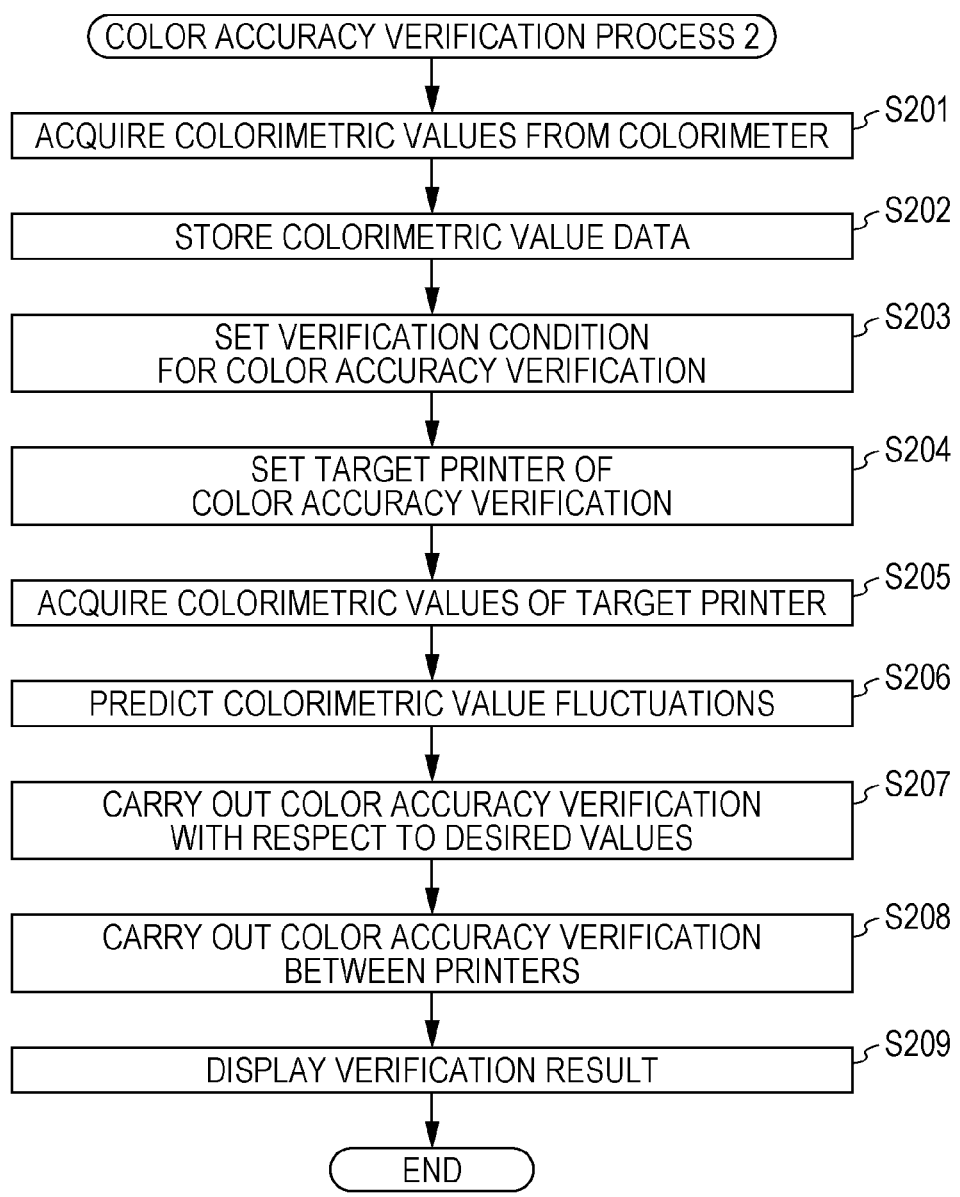
FIG. 11 is a flowchart illustrating an example of a color accuracy verification process according to one or more embodiments.

FIG. 11 is a flowchart illustrating an example of the color accuracy verification process 2 according to one or more embodiments. This process is implemented by a CPU 11 executing a color accuracy verification program 141 kept in a storage part 14. In one or more embodiments, the CPU 11 cooperates with the other units 12 to 18 of the color accuracy verification device 1 to function as a colorimetric value data acquirer, a colorimetric value data storage part, a verification condition setter, a target printer setter, the colorimetric value predictor, a color accuracy verifier, and a display controller.

Also in one or more embodiments, the case of predicting the color accuracy verification result on the basis of colorimetric value data of February 19 to February 28 obtained after the correction work will be described. In addition, the color accuracy is assumed to be verified between the target printers using verification items similar to the verification items of color accuracy verification with respect to the desired values.

Processes in steps S201 to S207 are performed similarly to the processes in steps S101 to S107 in FIG. 5 described in the embodiments above.

In step S208 in FIG. 11, the CPU 11 verifies the current color accuracy between the target printers based on the current data of the colorimetric values (the colorimetric value data of February 28), and also verifies (predicts) the future color accuracy between the target printers based on the predicted data of the colorimetric values (a process as the color accuracy verifier).

The current color accuracy is verified between the target printers by, for example, calculating the color difference ΔE in the current data (the colorimetric value data of February 28) of each color patch for any two printers among the target printers and determining the pass/fail for each verification item. In one or more embodiments, the color accuracy is verified for all combinations obtained by selecting two printers from among the target printers, and a resultant value obtained by merging worst values of the respective verification results is treated as the color accuracy verification result between the target printers.

Figure 12A:
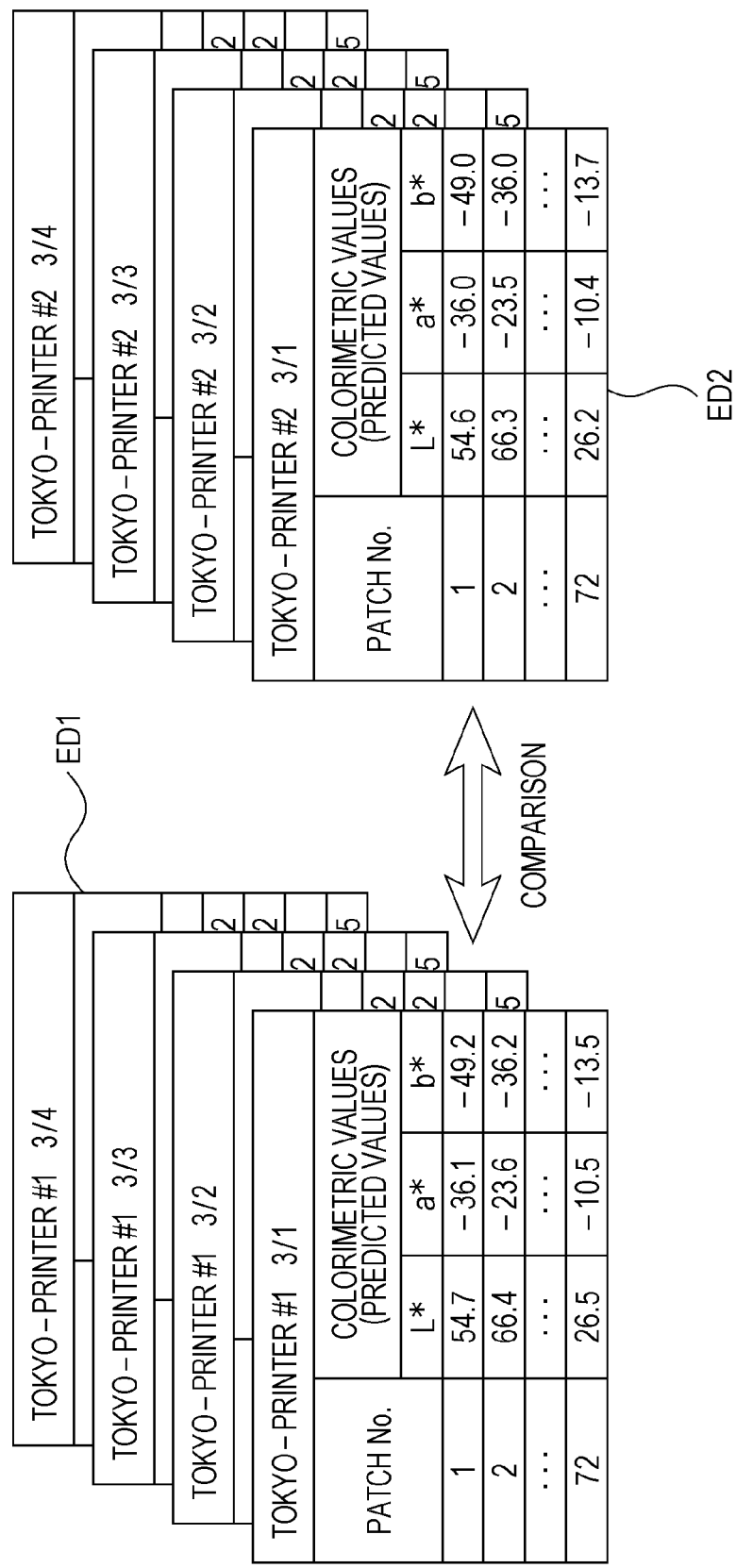

The future color accuracy is also verified similarly between the target printers. That is, as illustrated in FIG. 12A, in color accuracy verification (prediction) between printers #1 and #2, predicted data ED1 of the colorimetric values of the printer #1 and predicted data ED2 of the colorimetric values of the printer #2 are compared and the color difference ΔE of each color patch is calculated. Then, the pass/fail is determined for each verification item using the calculated ΔE.

Figure 12B:
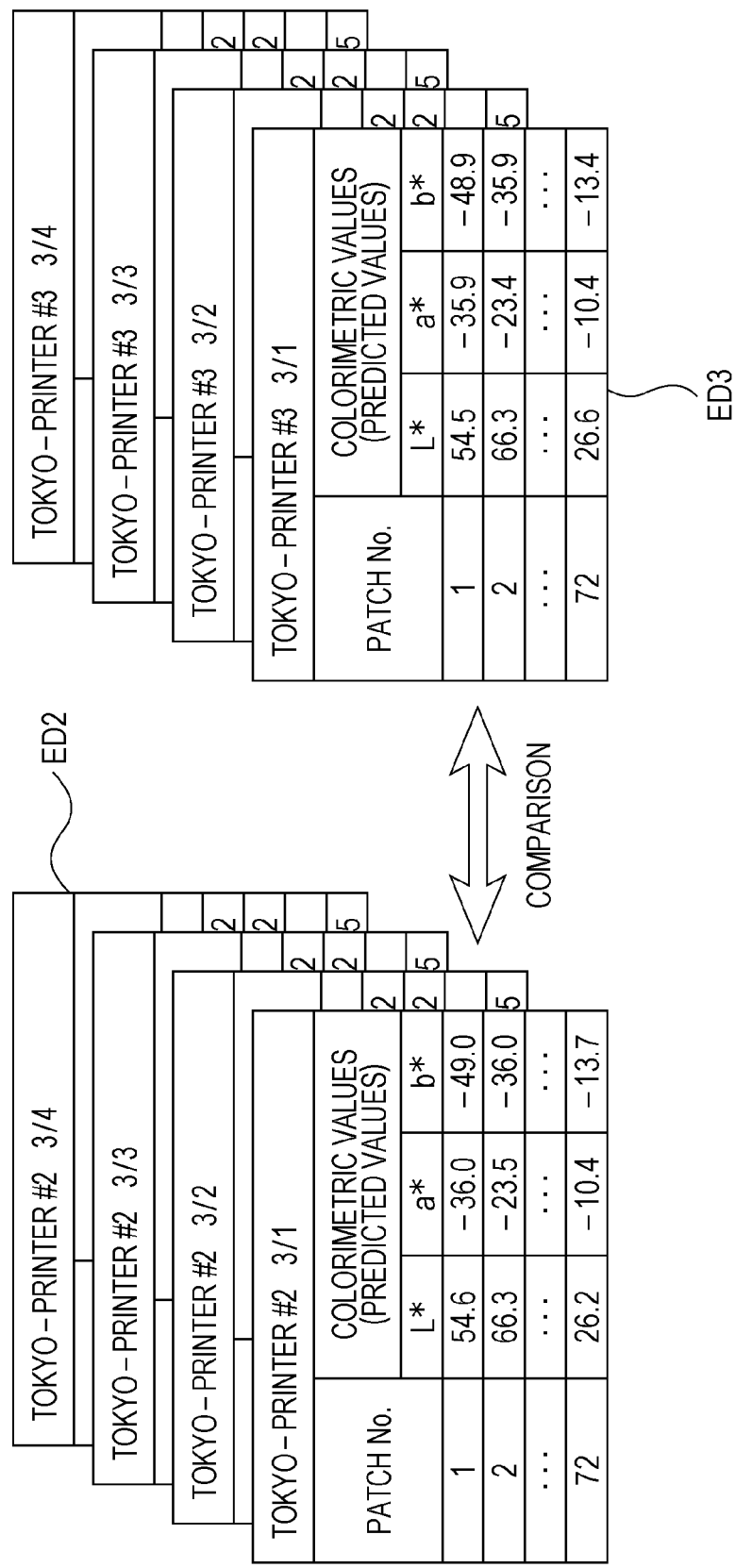

Similarly, the color difference ΔE of each color patch is calculated between the printers #2 and #3 and between the printers #3 and #1 (see FIGS. 12B and 12C), and the pass/fail is determined for each verification item using the calculated ΔE. In one or more embodiments, a resultant value obtained by merging the worst values of the verification results between the printers #1 and #2 (see FIG. 13A), the verification results between the printers #2 and #3 (see FIG. 13B), and the verification results between the printers #3 and #1 (see FIG. 13C) of the same predicted date is treated as the color accuracy verification result between the target printers on the predicted date.

Then, the color accuracy is verified between the target printers in ascending order of dates from predicted data of a date closest to the current time point (for example, the predicted data of March 1), and a predicted date at which the verification will fail is extracted (see FIG. 14). In FIG. 14, at the time point of March 1, since all of the ΔE_average, ΔE_maximum, and ΔE_primary color meet the acceptance criteria, the color accuracy verification result is regarded as "pass". On the other hand, at the time point of March 3, since the ΔE_average and the ΔE_maximum meet the acceptance criteria, but the ΔE_primary color does not meet the acceptance criteria, the color accuracy verification result is regarded as "fail".

After color accuracy verification is carried out in steps S207 and S208, the CPU 11 displays the color accuracy verification result on a display part 15 in step S209 (a process as the display controller). The color accuracy verification result includes the prediction result of the future color accuracy verification between the target printers.

FIG. 15 is a diagram illustrating a display example of color accuracy verification results according to one or more embodiments.

On a verification result screen D3 illustrated in FIG. 15, the verification result for each target printer with respect to the desired values and "predicted date of fail of verification" as the verification result between the target printers are displayed for each target printer of color accuracy verification. In FIG. 15, predicted dates at which the verification result with respect to the desired values will fail are placed in the order of dates from a date closest to the present at the top.

Note that the current color accuracy verification result with respect to the desired values is not displayed in FIG. 15; however, since it is possible to learn that the current color accuracy verification result is a pass from the verification result for each target printer with respect to the desired values (predicted date of fail of verification), the current color accuracy verification result is deemed to be displayed. As in other embodiments, the current color accuracy verification result with respect to the desired values may be displayed as "latest result" (see FIG. 10).

On the verification result screen D3 illustrated in FIG. 15, the user can learn that the color accuracy verification result with respect to the desired values will fail on March 4 for the printer #2, on March 5 for the printer #3, and on March 7 for the printer #1. In addition, it is possible to learn that the color accuracy verification result between the printers #1 to #3 will fail on March 3. Then, in a case where the scheduled execution date of the distributed printing performed using the printers #1 to #3 is March 3 or later, the user can find out that a correction work for improving the color accuracy is necessary before the scheduled execution date of the distributed printing.

In other words, in one or more embodiments, it is allowed to easily learn that the color accuracy verification result between the target printers will fail earlier than the color accuracy verification result for each target printer with respect to the desired values, such that a situation is promptly detected beforehand in which deterioration in color accuracy is expected in printed matters obtained by the distributed printing by the target printers by an amount greater than the management upper limit.

For example, even if the color accuracy with respect to the desired values meets the acceptance criteria in each of the target printers, the color accuracy deteriorates by an amount greater than the management upper limit between a printed matter created by a printer meeting the acceptance criteria near the upper limit and a printed matter created by a printer meeting the acceptance criteria near the lower limit; according to one or more embodiments, however, such a situation is promptly detected beforehand.

As described above, the color accuracy verification device 1 according to one or more embodiments includes: a network I/F 17 (colorimetric value data acquirer) that acquires the colorimetric values of each color patch of the color accuracy verification charts C formed by a plurality of printers 32; the storage part 14 (colorimetric value data storage part) that stores the colorimetric values in time series for each of the plurality of printers 32; the CPU 11 (target printer setter) that sets a target printer for which color accuracy verification is to be carried out; the CPU 11 (color accuracy verifier) that verifies the color accuracy based on the colorimetric values of the target printer stored in the colorimetric value data storage part and the verification reference values set in advance; and the display part 15 that displays the verification result by the color accuracy verifier for each target printer.

In addition, a color accuracy verification method according to one or more embodiments includes: a phase of acquiring the colorimetric values of each color patch of the color accuracy verification charts C formed by the plurality of printers 32 (step S201 in FIG. 11); a phase of storing the colorimetric values in time series for each of the plurality of printers 32 (step S202); a phase of setting a target printer for which color accuracy verification is to be carried out (step S204); a phase of verifying the color accuracy based on the colorimetric values of the target printer and the verification reference values set in advance (steps S207 and S208); and a phase of displaying the verification result for each target printer (step S209).

Furthermore, the color accuracy verification program 141 according to one or more embodiments causes the color accuracy verification device 1 (computer) to execute: a process of acquiring the colorimetric values of each color patch of the color accuracy verification charts C formed by the plurality of printers 32 (step S201 in FIG. 11); a process of storing the colorimetric values in time series for each of the plurality of printers 32 (step S202); a process of setting a target printer for which color accuracy verification is to be carried out (step S204); a process of verifying the color accuracy based on the colorimetric values of the target printer and the verification reference values set in advance (steps S207 and S208); and a process of displaying the verification result for each target printer (step S209).

This color accuracy verification program 141 is provided, for example, via a computer-readable portable storage medium (including an optical disc, a magneto-optical disk, and a memory card) in which the program is kept. In addition, for example, the color accuracy verification program 141 may be provided by download from a server holding the program via a network.

According to the color accuracy verification device 1, the color accuracy verification method, and the color accuracy verification program 141 of one or more embodiments, the color accuracy of printed matters created by the plurality of printers 32 is properly ensured by centrally managing the color accuracy of the plurality of printers 32.

Specifically, in the color accuracy verification device 1 according to one or more embodiments, the CPU 11 (color accuracy verifier) reads out colorimetric values corresponding to the target printer from the storage part 14 (colorimetric value data storage part), and verifies the color accuracy between the target printers based on the color differences ΔE (differences) in the colorimetric values between the target printers.

With this process, the color accuracy between the target printers is centrally managed with ease.

The color accuracy verification device 1 according to one or more embodiments also includes the CPU 11 (colorimetric value predictor) that predicts future colorimetric values based on the time-series fluctuations of the colorimetric values stored in the storage part 14 (colorimetric value data storage part), and the CPU 11 (color accuracy verifier) verifies the future color accuracy for each target printer based on the differences between the predicted colorimetric values and the verification reference values.

Specifically, in the color accuracy verification device 1 according to one or more embodiments, the CPU 11 (color accuracy verifier) verifies the future color accuracy between the target printers based on ΔE (differences) in the predicted colorimetric values between the target printers.

With this process, the color accuracy between the target printers including the future prediction result is centrally managed with ease. Accordingly, when a plurality of printers shares one print job to execute in coordination, such as at the distributed printing, or when a print job executed in the past is re-executed, the color accuracy of the printed matter is reliably maintained constant owing to the printer correction work carried out at an appropriate timing and frequency, while waste of resources and man-hours due to unneeded correction work is preferably prevented.

In the color accuracy verification device according to one or more embodiments, the plurality of printers 32 constitutes a distributed printing system 3 that distributes one print job to print.

With this configuration, since the color accuracy of the printers that execute the same print job in the distributed printing system 3 is centrally managed with ease, it is allowed to confirm beforehand whether or not the color tones between the printed matters will coincide with each other and to create high quality printed matters.

Furthermore, the color accuracy verification device 1 according to one or more embodiments includes the CPU 11 (verification condition setter) that sets the verification condition for color accuracy, and the CPU 11 (color accuracy verifier) verifies the color accuracy based on the set verification condition.

This makes it easier to grasp the color accuracy conforming to a standard designated in the print job or the like.

In one or more embodiments, a color accuracy verification device 1 verifies the color accuracy between the target printer and a specific printer on specific date and time and also verifies (predicts) the future color accuracy between the target printer and a specific printer on specific date and time based on the transition of the colorimetric values, to display the verification result. That is, in one or more embodiments, the color accuracy of the target printer is verified using colorimetric values of a specific printer on specific date and time (hereinafter, referred to as "reference colorimetric values") as verification reference values.

For example, when a print job that has been executed once is to be re-executed on another day, it is necessary to ensure the color accuracy between the first proof printed matter and the second proof printed matter. Therefore, in one or more embodiments, the color accuracy of the target printer is verified using the colorimetric values at the time of first proof printing as verification reference values. Specifically, a color accuracy verification process 3 according to one or more embodiments is executed in accordance with a flowchart illustrated in FIG. 16.

Note that, since the configuration of a color accuracy verification system S is similar to the configuration of the other embodiments, the description will be omitted.

Figure 16:
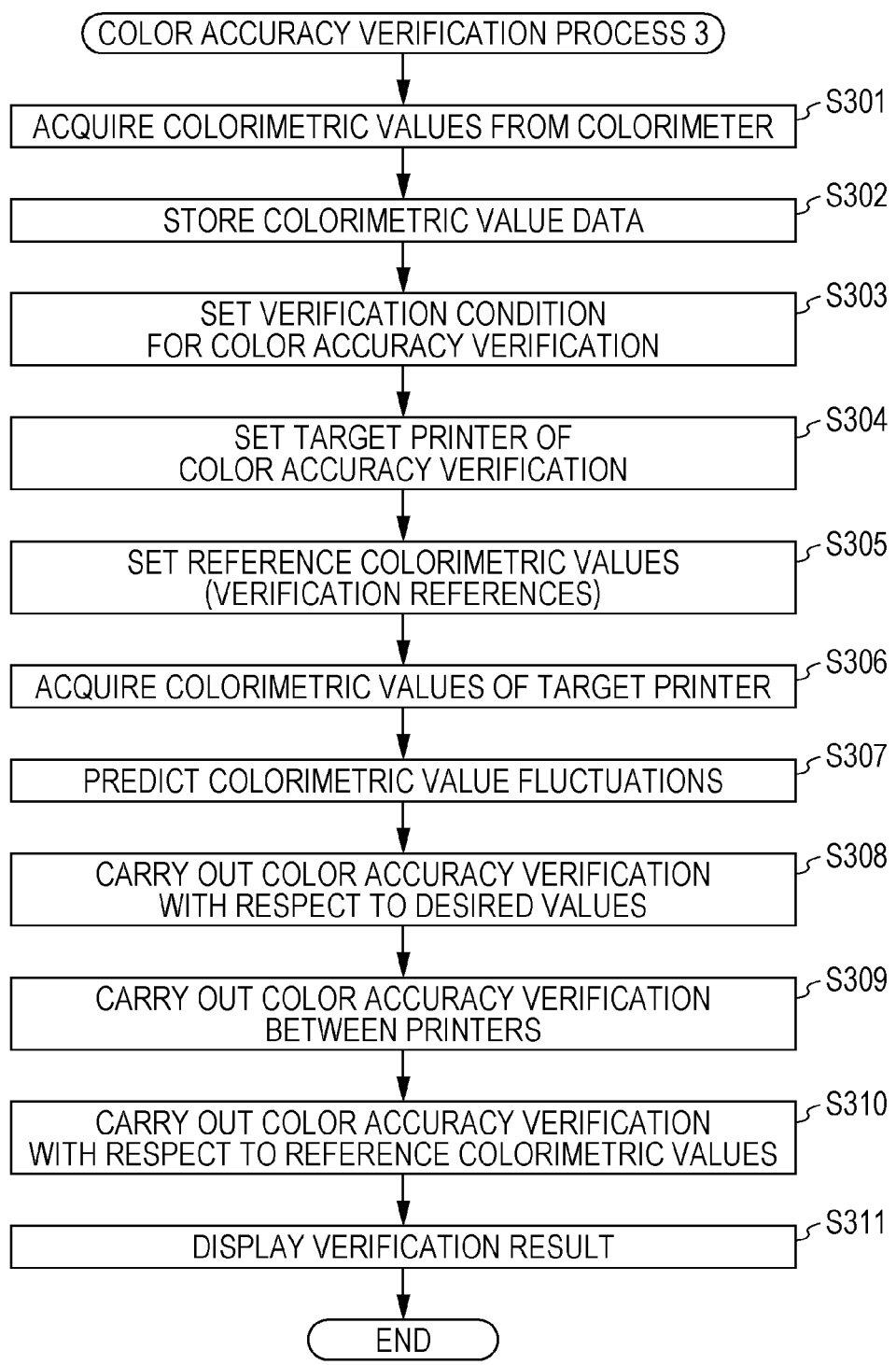
FIG. 16 is a flowchart illustrating an example of a color accuracy verification process according to one or more embodiments.

FIG. 16 is a flowchart illustrating an example of the color accuracy verification process 3 according to one or more embodiments. This process is implemented by a CPU 11 executing a color accuracy verification program 141 kept in a storage part 14. In one or more embodiments, the CPU 11 cooperates with the other units 12 to 18 of the color accuracy verification device 1 to function as a colorimetric value data acquirer, a colorimetric value data storage part, a verification condition setter, a target printer setter, a verification reference setter, a colorimetric value predictor, a color accuracy verifier, and a display controller.

Also in one or more embodiments, the case of predicting the color accuracy verification result on the basis of colorimetric value data of February 19 to February 28 obtained after the correction work will be described. In addition, the color accuracy of the target printer with respect to the reference colorimetric values is assumed to be verified using verification items similar to the verification items of color accuracy verification with respect to the desired values.

Processes in steps S301 to S304 are performed similarly to the processes in steps S101 to S104 in FIG. 5 described in the embodiments above.

In step S305 in FIG. 16, the CPU 11 sets a verification reference of color accuracy verification (a process as the verification reference setter). For example, after the verification condition and the target printers are set on the setting screen D1 as illustrated in FIG. 6, the CPU 11 displays a setting screen D4 as illustrated in FIG. 17 on a display part 15 and, based on an operation to an operation inputter 16 on the displayed setting screen D4, sets the verification reference. In one or more embodiments, a case where the colorimetric values of 2018 Feb. 26 of the printer #1 installed in a distributed printing system 3A at the site in Tokyo is set as verification reference values will be described.

FIG. 17 is a diagram illustrating an example of a setting screen for setting a verification reference of color accuracy verification.

In the setting screen D4 illustrated in FIG. 17, a selection item C21 of "selection of verification reference printer" for setting the verification reference of color accuracy verification and a selection item C22 of "selection of reference date" are arranged. In addition, in the lower part of the setting screen D4, operation buttons B21 and B22 for fixing or canceling the selection in the selection items C21 and C22 are arranged.

In the setting screen D4, a list of printers selectable as a verification reference is displayed in the selection item C21.

In FIG. 17, the printers #1 to #3 are selectable and "printer #1" is being selected from among the selectable printers #1 to #3.

In addition, an input field for the reference date is displayed in the selection item C22. In FIG. 17, Feb. 26, 2018 is input as the reference date.

The user can set when colorimetric values used as verification references were acquired from which printer, in the selection items C21 and C22. For example, a printer used for the first proof printing is selected in the selection item C21, and the first proof print date and time is input in the selection item C22.

After the verification references are set in step S305 in FIG. 16, processes in steps S306 to S309 are performed. These processes are performed similarly to the processes in steps S205 to S208 in FIG. 11 described in the embodiments above.

In step S310, the CPU 11 verifies the color accuracy with respect to the reference colorimetric values (the colorimetric values of 2018 Feb. 26 of the printer #1) for each target printer, and also verifies (predicts) the future color accuracy with respect to the reference colorimetric values based on the predicted data of the colorimetric values (a process as the color accuracy verifier).

The current color accuracy with respect to the reference colorimetric values is verified by, for example, calculating the color difference ΔE between the current data for each color patch and the colorimetric value data set as the verification reference, and determining the pass/fail for each verification item.

The future color accuracy with respect to the reference colorimetric values is similarly verified. That is, as illustrated in FIGS. 18A to 18C, the color differences ΔE are calculated by comparing predicted data ED1 to predicted data ED3 for each color patch acquired in step S307 with reference colorimetric value data BD set as the verification reference, and the pass/fail is determined for each verification item.

Then, the color accuracy with respect to the verification reference is verified in ascending order of dates from predicted data of a date closest to the current time point (for example, the predicted data of March 1), and a predicted date at which the verification will fail is extracted. In other words, the color accuracy is verified similarly to color accuracy verification with respect to the desired values described in the embodiments above except that the comparison targets differ from each other.

After color accuracy verification is carried out in steps S308 to S310, the CPU 11 displays the color accuracy verification result on the display part 15 in step S311 (a process as the display controller). The color accuracy verification result includes the prediction result of the future color accuracy verification with respect to the reference colorimetric values.

FIG. 19 is a diagram illustrating a display example of color accuracy verification results according to one or more embodiments.

On a verification result screen D5 illustrated in FIG. 19, the verification result for each target printer with respect to the desired values and "predicted date of fail of verification" as the verification result with respect to the reference colorimetric values are displayed. In FIG. 19, predicted dates at which the verification result with respect to the desired values will fail are placed in the order of dates from a date closest to the present at the top.

Note that the current color accuracy verification result with respect to the reference colorimetric values is not displayed in FIG. 19; however, since it is possible to learn that the current color accuracy verification result is a pass from the verification result with respect to the reference colorimetric values (predicted date of fail of verification), the current color accuracy verification result with respect to the reference colorimetric values is deemed to be displayed. In addition, in FIG. 19, the verification result of a target printer with the earliest predicted date of fail of verification is displayed as the verification result with respect to the reference colorimetric values; however, the verification result with respect to the reference colorimetric values may be displayed for each target printer.

Furthermore, the current color accuracy verification result with respect to the desired values is not displayed in FIG. 19; however, since it is possible to learn that the current color accuracy verification result is a pass from the verification result for each target printer with respect to the desired values (predicted date of fail of verification), the current color accuracy verification result is deemed to be displayed. As in other embodiments, the current color accuracy verification result with respect to the desired values may be displayed as "latest result" (see FIG. 10). As in other embodiments, the color accuracy verification result between the target printers may also be displayed (see FIG. 15).

On the verification result screen D5 illustrated in FIG. 19, the user can learn that the color accuracy verification result with respect to the desired values will fail on March 4 for the printer #2, on March 5 for the printer #3, and on March 7 for the printer #1. In addition, it is possible to learn that the color accuracy verification result with respect to the printers #1 on February 26 will fail on March 2. Then, in a case where a print job executed by the printer #1 on February 26 is executed on March 2 or later using the printers #1 to #3, the user can find out that a correction work for improving the color accuracy is necessary before the execution of the print job using the printers #1 to #3.

In other words, in one or more embodiments, it is allowed to easily learn that the color accuracy verification result with respect to a specific printer on specific date and time set as the verification reference will fail earlier than the color accuracy verification result for each target printer with respect to the desired values, such that a situation in which deterioration in color accuracy is expected between the first proof printed matter and the second proof printed matter by an amount greater than the management upper limit is promptly detected beforehand in a case where the same print job is printed again. Accordingly, variations in color tones between the first proof printed matter and the second proof printed matter are preferably prevented.

In addition, in a case where it is only required that the first proof printed matter and the second proof printed matter match in color tones even if the color accuracy of each target printer with respect to the desired values does not meet the acceptance criteria, the productivity of the printed matter is suitably enhanced.

As described above, the color accuracy verification device 1 according to one or more embodiments includes: a network I/F 17 (colorimetric value data acquirer) that acquires the colorimetric values of each color patch of the color accuracy verification charts C formed by a plurality of printers 32; the storage part 14 (colorimetric value data storage part) that stores the colorimetric values in time series for each of the plurality of printers 32; the CPU 11 (target printer setter) that sets a target printer for which color accuracy verification is to be carried out; the CPU 11 (color accuracy verifier) that verifies the color accuracy based on the colorimetric values of the target printer stored in the colorimetric value data storage part and the verification reference values set in advance; and the display part 15 that displays the verification result by the color accuracy verifier for each target printer.

In addition, a color accuracy verification method according to one or more embodiments includes: a phase of acquiring the colorimetric values of each color patch of the color accuracy verification charts C formed by the plurality of printers 32 (step S301 in FIG. 16); a phase of storing the colorimetric values in time series for each of the plurality of printers 32 (step S302); a phase of setting a target printer for which color accuracy verification is to be carried out (step S304); a phase of verifying the color accuracy based on the colorimetric values of the target printer and the verification reference values set in advance (steps S308 to S310); and a phase of displaying the verification result for each target printer (step S311).

Furthermore, the color accuracy verification program 141 according to one or more embodiments causes the color accuracy verification device 1 (computer) to execute: a process of acquiring the colorimetric values of each color patch of the color accuracy verification charts C formed by the plurality of printers 32 (step S301 in FIG. 16); a process of storing the colorimetric values in time series for each of the plurality of printers 32 (step S302); a process of setting a target printer for which color accuracy verification is to be carried out (step S304); a process of verifying the color accuracy based on the colorimetric values of the target printer and the verification reference values set in advance (steps S308 to S310); and a process of displaying the verification result for each target printer (step S311).

This color accuracy verification program 141 is provided, for example, via a computer-readable portable storage medium (including an optical disc, a magneto-optical disk, and a memory card) in which the program is kept. In addition, for example, the color accuracy verification program 141 may be provided by download from a server holding the program via a network.

According to the color accuracy verification device 1, the color accuracy verification method, and the color accuracy verification program 141 of one or more embodiments, the color accuracy of printed matters created by the plurality of printers 32 is properly ensured by centrally managing the color accuracy of the plurality of printers 32.

Specifically, the color accuracy verification device 1 according to one or more embodiments includes the CPU 11 (verification reference setter) that sets the colorimetric values of a specific printer on specific date and time as reference colorimetric values, from among colorimetric values stored in the storage part 14 (colorimetric value data storage part), and the CPU 11 (color accuracy verifier) reads out colorimetric values corresponding to the target printer from the colorimetric value data storage part, and verifies the color accuracy for each target printer based on the differences between the colorimetric values and the reference colorimetric values.

With this process, the color accuracy of the target printer with respect to the reference colorimetric values is centrally managed with ease.

The color accuracy verification device 1 according to one or more embodiments also includes the CPU 11 (colorimetric value predictor) that predicts future colorimetric values based on the time-series fluctuations of the colorimetric values stored in the storage part 14 (colorimetric value data storage part), and the CPU 11 (color accuracy verifier) verifies the future color accuracy for each target printer based on the differences between the predicted colorimetric values and the verification reference values.

Specifically, the color accuracy verification device 1 according to one or more embodiments includes the CPU 11 (verification reference setter) that sets the colorimetric values of a specific printer on specific date and time as reference colorimetric values, from among colorimetric values stored in the storage part 14 (colorimetric value data storage part), and the CPU 11 (color accuracy verifier) verifies the future color accuracy for each target printer based on the differences between the predicted colorimetric values and the reference colorimetric values.

With this process, the color accuracy of the target printer with respect to the reference colorimetric values including the future prediction result is centrally managed with ease. Accordingly, when a plurality of printers shares one print job to execute in coordination, such as at the distributed printing, or when a print job executed in the past is re-executed, the color accuracy of the printed matter is reliably maintained constant owing to the printer correction work carried out at an appropriate timing and frequency, while waste of resources and man-hours due to unneeded correction work is preferably prevented.

In addition, in the color accuracy verification device 1 according to one or more embodiments, the plurality of printers 32 constitutes a distributed printing system 3 that distributes one print job to print.

With this configuration, since the color accuracy of the printers that execute the same print job in the distributed printing system 3 is centrally managed with ease, it is allowed to confirm beforehand whether or not the color tones between the printed matters will coincide with each other and to create high quality printed matters.

Furthermore, the color accuracy verification device 1 according to one or more embodiments includes the CPU 11 (verification condition setter) that sets the verification condition for color accuracy, and the CPU 11 (color accuracy verifier) verifies the color accuracy based on the set verification condition.

This makes it easier to grasp the color accuracy conforming to a standard designated in the print job or the like.

While the invention made by the present inventors has been specifically described thus far based on one or more embodiments, the present invention is not limited to the above embodiments and can be modified within a range not departing from the gist thereof.

For example, in the color accuracy verification device 1 according to one or more embodiments, the specific printer may be the same printer as the target printer. In this case, one printer may be set as a target printer of color accuracy verification.

With this configuration, since it is allowed to confirm beforehand whether or not the color tones between the printed matters will coincide with each other also when the print job is executed at different print date and time with the same printer, high quality printed matters are reliably created.

In addition, for example, in one or more embodiments, a list of printers treated as management targets of the color accuracy verification system S is displayed as illustrated in FIG. 6, and the user sets the target printer of color accuracy verification in the selection item C12; however, the target printer may be set by another method.

Figure 20:
FIG. 20 is a diagram illustrating another example of the setting screen for setting a target printer.

FIG. 20 is a diagram illustrating another example of the setting screen for setting a target printer.

On a setting screen D6 illustrated in FIG. 20, a selection item C31 of "list of print jobs" for selecting a target printer for which color accuracy verification is to be carried out is arranged. In addition, in the lower part of the setting screen D6, operation buttons B31 and B32 for fixing or canceling the selection in the selection item C31 are arranged.

On the setting screen D6 illustrated in FIG. 20, information regarding the execution of the print jobs executed by the distributed printing systems 3A and 3B is displayed in the selection item C31. The information regarding the execution of the print jobs is stored in the storage part 14 as the job execution data 144.

In FIG. 20, among pieces of information regarding the print jobs executed by the distributed printing systems 3A and 3B, information regarding print jobs executed by the distributed printing system 3A at the site in Tokyo is displayed, and the print job "Catalog-01" is being selected. Printers #1 to #3 associated with the selected print job are set as target printers of color accuracy verification.

As described above, the color accuracy verification device 1 according to one or more embodiments may be configured such that a printer scheduled to execute the print job or a printer that has executed the print job is set as a target printer by selecting the print job executed by the distributed printing systems 3A and 3B.

That is, the color accuracy verification device 1 includes the network I/F (communicator) capable of mutually communicating with the distributed printing system 3, and the storage part 14 (job execution data storage part) that stores information regarding the execution of the print job acquired from the distributed printing system 3 via the communicator. The information regarding the execution of the print job includes the printer that executes the print job and the execution date and time of the print job. The CPU 11 (target printer setter) sets a printer associated with a print job designated via the operation inputter 16 as a target printer.

With this configuration, for example, when the user wants to grasp the color accuracy (the color accuracy with respect to the desired values and the color accuracy between the printers) of the printers 32 used for the distributed printing, the user is allowed to easily set the wanted target printers with a simple operation of selecting a print job.

In addition, in one or more embodiments, as illustrated in FIG. 17, a list of printers selectable as a verification reference and an input field for the reference date are displayed, and the user sets the verification reference printer and the reference date in the selection items C21 and C22; however, the verification reference of color accuracy verification may be set by another method.

FIG. 21 is a diagram illustrating another example of the setting screen for setting the verification reference.

On a setting screen D7 illustrated in FIG. 21, a selection item C41 of "list of print jobs" for selecting a verification reference of color accuracy verification is arranged. In addition, in the lower part of the setting screen D7, operation buttons B41 and B42 for fixing or canceling the selection in the selection item C41 are arranged.

On the setting screen D7 illustrated in FIG. 21, information regarding the execution of the print jobs executed in the past by the distributed printing systems 3A and 3B is displayed in the selection item C41. The information regarding the execution of the print jobs is stored in the storage part 14 as the job execution data 144.

In FIG. 21, among pieces of information regarding the print jobs executed by the distributed printing systems 3A and 3B, information regarding print jobs executed in the past by the distributed printing system 3A at the site in Tokyo is displayed, and the print job "Questionnaire-94" is being selected. The colorimetric values at the time point of 2018 Feb. 27 (specific date and time) of the printer #3 (specific printer) associated with the selected print job is set as reference colorimetric values (verification references). Note that, when a plurality of printers is associated with the print job, for example, a selection screen for selecting one of the associated printers is displayed.

As described above, the color accuracy verification device 1 according to one or more embodiments may be configured such that the colorimetric values corresponding to a printer that has executed the print job and the print execution date and time are set as reference colorimetric values by selecting the print job executed in the past by the distributed printing systems 3A or 3B.

That is, the color accuracy verification device 1 includes the network I/F 17 (communicator) capable of mutually communicating with the distributed printing system 3, and the storage part 14 (job execution data storage part) that stores information regarding the execution of the print job acquired from the distributed printing system 3 via the communicator. The information regarding the execution of the print job includes the printer that executes the print job and the execution date and time of the print job. The CPU 11 (verification reference setter) sets colorimetric values corresponding to the printer and the execution date and time associated with a print job designated via the operation inputter 16, as reference colorimetric values.

With this configuration, for example, the user is allowed to easily designate a specific printer and specific date and time with a simple operation of selecting a print job when re-executing a print job executed in the past, and to set wanted reference colorimetric values (verification references).

Figure 22:
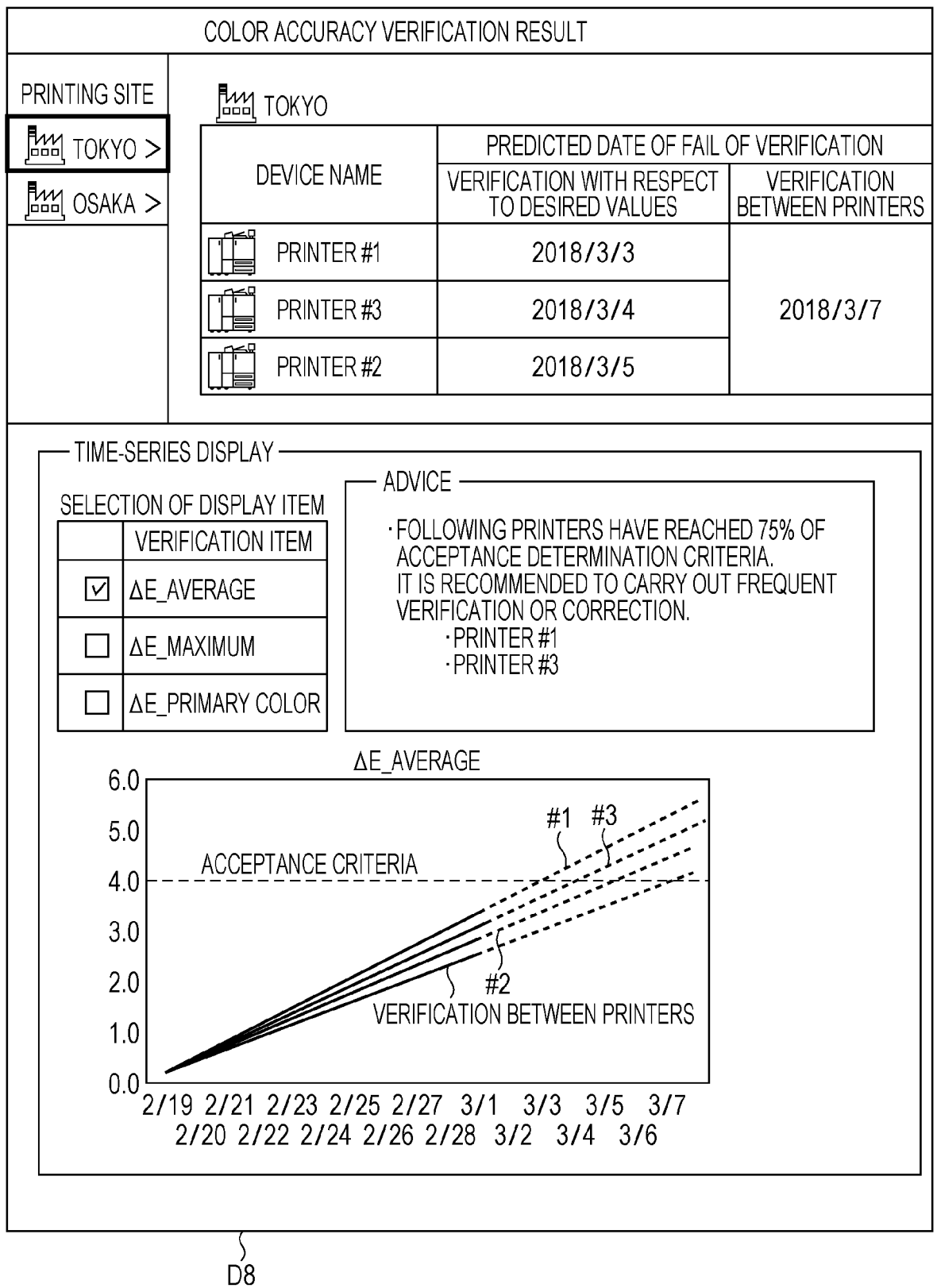
FIG. 22 is a diagram illustrating another display example of color accuracy verification results according to one or more embodiments.

In addition, in one or more embodiments, as illustrated in FIGS. 10 and 19, only the predicted date of fail of verification is displayed as the prediction result of color accuracy verification; however, the time-series fluctuations of the verification values (such as the $\Delta E\_average$) based on the differences between the colorimetric values of the target printer and the verification reference values (desired values or reference colorimetric values) may also be displayed (see FIGS. 22 and 23).

A verification result screen D8 illustrated in FIG. 22 is another display example of the color accuracy verification result according to one or more embodiments, and the time-series fluctuations of the $\Delta E\_averages$ of the printers #1 to #3 with respect to the desired values (see FIG. 9) and the $\Delta E\_average$ between the printers #1 and #3 (see FIG. 14) are displayed. Furthermore, a verification result screen D9 illustrated in FIG. 23 is another display example of the color accuracy verification result according to one or more embodiments, and the time-series fluctuations of the $\Delta E\_averages$ of the printers #1 and #2 with respect to the colorimetric values (reference colorimetric values) at the time point of 2018 Feb. 19 of the printer #1 are displayed.

On this screen, the user is allowed to visually grasp the time-series fluctuations of the color accuracy verification result, such that the convenience is enhanced.

Additionally, as illustrated in FIG. 22, information regarding color management of the target printer (frequency of carrying out color accuracy verification and correction instruction) may be presented along with the verification result. In FIG. 22, information regarding color management of the target printer is presented as "advice".

On this screen, the user is allowed to appropriately grasp the frequency of carrying out color accuracy verification and the timing of carrying out the correction work, such that the convenience is enhanced.

Furthermore, as illustrated in FIG. 23, the setting screen for the verification reference and the verification result screen may be displayed on the same screen. As described above, the display modes of the setting screen and the verification result screen of color accuracy verification are not limited to the modes indicated in one or more of the above embodiments.

Moreover, the color accuracy verification device 1 may be installed on a so-called cloud such that the instruction to carry out color accuracy verification can be made or the verification result can be viewed using a browser of a computer terminal (for example, a personal computer or a tablet terminal).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A color accuracy verification device comprising:
   a hardware processor that:
      acquires a colorimetric value for each color patch of color accuracy verification charts generated by a plurality of printers;
      stores the colorimetric value in time series;
      sets a target printer to carry out color accuracy verification; and
      verifies color accuracy based on:
         the colorimetric value of the target printer stored in the hardware processor; and
         a verification reference value set in advance; and
   a display that displays a verification result verified by the hardware processor for the target printer, wherein
   the hardware processor further:
      predicts a future colorimetric value from a prediction curve obtained based on a time-series fluctuation of the colorimetric value stored in the hardware processor,
      verifies future color accuracy for the target printer based on a difference between a predicted colorimetric value and the verification reference value,
      determines whether verification of the future color accuracy passes or fails with respect to the verification reference value, and
      predicts a date at which the verification will fail based on the verification of the future color accuracy in ascending order of dates in the prediction curve.

2. The color accuracy verification device according to claim 1, wherein the hardware processor further:
   reads the colorimetric value that corresponds to the target printer; and
   verifies the color accuracy for the target printer based on a difference between the colorimetric value and a value prescribed of a color patch associated with the colorimetric value.

3. The color accuracy verification device according to claim 1, wherein the hardware processor further:
   sets a plurality of target printers;
   reads colorimetric values that correspond to the respective target printers; and
   verifies color accuracy between the target printers based on a difference in the colorimetric values of the target printers.

4. The color accuracy verification device according to claim 1, wherein the hardware processor further:
   sets, from among a plurality of colorimetric values, a reference colorimetric value of a specific printer on a specific date and time; and
   reads the reference colorimetric value that corresponds to the target printer; and
   verifies the color accuracy for the target printer based on a difference between the colorimetric value of the target printer and the reference colorimetric value.

5. The color accuracy verification device according to claim 1, wherein the hardware processor further verifies the future color accuracy for the target printer based on a difference between the predicted colorimetric value and a value prescribed for the color patches of the color accuracy verification charts.

6. The color accuracy verification device according to claim 1, wherein the hardware processor further:
   sets a plurality of target printers; and
   verifies the future color accuracy between the target printers based on a difference in a predicted colorimetric value of each of the target printers.

7. The color accuracy verification device according to claim 1, wherein the hardware processor further:
   sets, from a plurality of colorimetric values, a reference colorimetric value of a specific printer on specific date and time; and
   verifies the future color accuracy of the target printer based on a difference between the predicted colorimetric value and the reference colorimetric value.

8. The color accuracy verification device according to claim 4, wherein the specific printer is the target printer.

9. The color accuracy verification device according to claim 1, wherein the plurality of printers forms a distributed printing system that distributes a print job.

10. The color accuracy verification device according to claim 1, further comprising:
    a communicator that mutually communicates with a distributed printing system that distributes a print job; and
    a job execution data storage that stores information regarding execution of the print job acquired from the distributed printing system via the communicator, wherein
    the information regarding execution of the print job includes:
       a printer, among the plurality of printers, that executes the print job; and
       an execution date and time of the print job, and
    the hardware processor sets the printer associated with the print job as the target printer.

11. The color accuracy verification device according to claim 4, further comprising:
    a communicator that mutually communicates with a distributed printing system that distributes a print job; and
    a job execution data storage that stores information regarding execution of the print job acquired from the distributed printing system via the communicator, wherein
    the information regarding execution of the print job includes:
       a printer, among the plurality of printers, that executes the print job; and
       an execution date and time of the print job, and
    the hardware processor sets a reference colorimetric value that corresponds to the printer and the execution date and time.

12. The color accuracy verification device according to claim 1, wherein the hardware processor further:
    sets a verification condition for the color accuracy; and verifies the color accuracy based on the verification condition.

13. The color accuracy verification device according to claim 1, wherein the display displays a time-series fluctuation of a verification value based on a difference between the colorimetric value of the target printer and the verification reference value.

14. The color accuracy verification device according to claim 1, wherein the display presents information regarding color management of the target printer along with the verification result.

15. A color accuracy verification method comprising:
acquiring a colorimetric value for each color patch of color accuracy verification charts generated by a plurality of printers;
storing the colorimetric value in time series;
setting a target printer to carry out color accuracy verification;
verifying color accuracy based on:
the colorimetric value of the target printer; and
a verification reference value set in advance;
displaying a verification result for the target printer;
predicting a future colorimetric value from a prediction curve obtained based on a time-series fluctuation of the colorimetric value;
verifying future color accuracy for the target printer based on a difference between a predicted colorimetric value and the verification reference value;
determining whether verification of the future color accuracy passes or fails with respect to the verification reference value; and
predicting a date at which the verification will fail based on the verification of the future color accuracy in ascending order of dates in the prediction curve.

16. A non-transitory recording medium storing a computer readable program causing a computer to perform:
acquiring a colorimetric value for each color patch of color accuracy verification charts generated by a plurality of printers;
storing the colorimetric value in time series;
setting a target printer to carry out color accuracy verification;
verifying color accuracy based on:
the colorimetric value of the target printer; and
a verification reference value set in advance;
displaying a verification result for the target printer;
predicting a future colorimetric value from a prediction curve obtained based on a time-series fluctuation of the colorimetric value;
verifying future color accuracy for the target printer based on a difference between a predicted colorimetric value and the verification reference value;
determining whether verification of the future color accuracy passes or fails with respect to the verification reference value; and
predicting a date at which the verification will fail based on the verification of the future color accuracy in ascending order of dates in the prediction curve.

* * * * *